US012685904B2

(12) United States Patent
Michalewich et al.

(10) Patent No.: US 12,685,904 B2
(45) Date of Patent: Jul. 21, 2026

(54) COATING FREE, FINISHED GOLF BALL WITH POLYURETHANE COVER

(71) Applicant: Acushnet Company, Fairhaven, MA (US)

(72) Inventors: Michael Michalewich, Norton, MA (US); Manjari Kuntimaddi, Raynham, MA (US); Derek Ladd, Acushnet, MA (US); Courtney N. Engle, Fall River, MA (US); Michael R. Madson, Easton, MA (US); Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 156 days.

(21) Appl. No.: 18/238,808

(22) Filed: Aug. 28, 2023

(65) Prior Publication Data

US 2025/0073539 A1     Mar. 6, 2025

(51) Int. Cl.
| | |
|---|---|
| *A63B 37/12* | (2006.01) |
| *A63B 37/00* | (2006.01) |
| *B29C 63/00* | (2006.01) |
| *B29L 31/54* | (2006.01) |

(52) U.S. Cl.
CPC ........ *A63B 37/0075* (2013.01); *A63B 37/002* (2013.01); *A63B 37/0039* (2013.01); *B29C 63/0017* (2013.01); *B29C 63/0073* (2013.01); *B29L 2031/546* (2013.01)

(58) Field of Classification Search
CPC ............ A63B 37/0024; A63B 37/0004; A63B 37/0012
See application file for complete search history.

(56) References Cited

U.S. PATENT DOCUMENTS

| | | | |
|---|---|---|---|
| 5,334,673 A | 8/1994 | Wu | |
| 5,484,870 A | 1/1996 | Wu | |
| 6,331,150 B1 | 12/2001 | Ogg | |
| 6,350,793 B1 * | 2/2002 | Kennedy, III | ......... B29C 71/04 |
| | | | 525/193 |
| 6,506,851 B2 | 1/2003 | Wu | |
| 6,677,401 B2 | 1/2004 | Boehm et al. | |
| 6,756,436 B2 | 6/2004 | Rajagopalan et al. | |
| 6,774,187 B2 | 8/2004 | Voorheis et al. | |
| 6,835,794 B2 | 12/2004 | Wu et al. | |
| 6,982,301 B1 | 1/2006 | Voorheis et al. | |
| 6,992,135 B2 | 1/2006 | Boehm et al. | |
| 8,029,388 B2 | 10/2011 | Nardacci et al. | |
| 8,137,212 B2 | 3/2012 | Hebert et al. | |
| 9,849,341 B2 | 12/2017 | Madson et al. | |

(Continued)

OTHER PUBLICATIONS

"Self-cleaning Polyurethane and Polyester Coatings," Tang et al., University of Western Ontario—Electronic Thesis and Dissertation Repository; 120 Pages (2013).

(Continued)

*Primary Examiner* — Raeann Gorden

(74) *Attorney, Agent, or Firm* — Thomas P. Gushue

(57) ABSTRACT

A coating free, finished golf ball and a method of forming a coating free, finished golf ball are disclosed herein. The golf ball has an outermost surface defined exclusively via the cover. The cover disclosed herein can be formed from a polyurethane, polyurea, or hybrid of polyurethane-polyurea, in some examples.

22 Claims, 4 Drawing Sheets

(56) References Cited

U.S. PATENT DOCUMENTS

| | | | |
|---|---|---|---|
| 10,668,327 B2 | 6/2020 | Madson et al. | |
| 10,843,045 B2 | 11/2020 | Shinohara et al. | |
| 2001/0006914 A1* | 7/2001 | Ogg | A63B 37/0022 |
| | | | 473/383 |
| 2003/0069087 A1* | 4/2003 | Ichikawa | A63B 37/0084 |
| | | | 473/378 |
| 2005/0176523 A1 | 8/2005 | Boehm et al. | |
| 2008/0090678 A1 | 4/2008 | Kim et al. | |
| 2010/0056304 A1* | 3/2010 | Egashira | A63B 37/0003 |
| | | | 473/378 |
| 2012/0202620 A1 | 8/2012 | Ogg et al. | |
| 2014/0250609 A1* | 9/2014 | Tutmark | A63B 37/00221 |
| | | | 8/515 |
| 2014/0357425 A1 | 12/2014 | Coats et al. | |
| 2015/0101946 A1 | 4/2015 | Koffler | |
| 2018/0193703 A1* | 7/2018 | Nardacci | A63B 37/0012 |
| 2021/0077861 A1 | 3/2021 | Shinohara et al. | |
| 2021/0252342 A1* | 8/2021 | Simonutti | A63B 37/0029 |

OTHER PUBLICATIONS

"Wilson Staff Model R (Raw) Golf Ball," Tony Covey; webpage <https://mygolfspy.com/news-opinion/wilson-staff-model-r-raw-golf-ball/>; 16 Pages (Nov. 17, 2020).

* cited by examiner

COATING FREE, FINISHED GOLF BALL WITH POLYURETHANE COVER

FIELD OF THE INVENTION

This disclosure generally relates to a golf ball, and is more particularly related to a coating free, finished golf ball having a polyurethane, polyurea, or hybrid of polyurethane-polyurea cover.

BACKGROUND OF THE INVENTION

Golf balls typically undergo a finishing process which usually includes applying a coating and/or painting layer to the outer surface of the golf ball (i.e., the cover). Application of additional layers to a golf ball cover, such as paint, coating, primer, etc., inherently introduces an additional manufacturing step, which can lead to unequal application of the additional layers thereby negatively impacting the aerodynamic characteristics of the golf ball.

Uncoated, finished golf balls are commercially available, but due to the lack of an outer coating or paint layer, these golf balls are susceptible to quickly picking up dirt and becoming uncleanable. This is undesirable both from an aesthetic and performance standpoint.

It would be desirable to provide a solution for a coating free, finished golf ball that addresses these issues.

SUMMARY OF THE INVENTION

In some embodiments, the present disclosure is directed to a coating free, finished golf ball. The term coating free, finished golf ball can refer to a golf ball having an outermost layer that consists only of the cover (i.e., the outermost layer is not a coating, primer, and/or paint layer). The finished golf ball lacks any additional layers or coatings that would otherwise be applied to the cover of the golf ball. In this manner, the cover of the finished golf ball is exposed or bare. The coating free, finished golf ball is suitable for retail and ordinary play, and does not require any coatings, paint, clear coat, primer, etc. The term "finished" as used in this context can be synonymous with a "final product" or "finished product," which is used in the industry to refer to a product that is ready for sale. The term "finished" as used in this context can be contrasted with an "intermediate good" or "semi-finished product," which is used in the industry to refer to a product which is not ready for sale. The cover is bare or exposed such that the environmental conditions directly contact the cover. Accordingly, the cover disclosed herein includes various modifications, such as chemical, structural, aerodynamic, and other modifications to make the coating free, finished golf ball suitable for retail and ordinary play.

In one example, a coating free, finished golf ball is provided that includes a core, and a cover defining an outermost surface of the coating free, finished golf ball such that the cover is bare. In one example, the golf ball does not include any additional layers or coatings besides the core and the cover. The cover is formed from a composition comprising ionomer and at least one of: (i) a silicone-based cleaning additive or a siloxane-based cleaning additive; (ii) a gloss-enhancing additive; (iii) a polydimethylsiloxane based soft segment; or (iv) an anatase nano-titanium dioxide (TiO2). In one example, the coating free, finished golf ball consists of exactly two components: the core and the cover.

The composition of the cover can further comprise an ultraviolet absorbing additive. The ultraviolet absorbing additive can be benzotriazole-based.

The cover can further comprise a marking. The marking can be integrally molded into the cover. The marking can be disposed on a layer of the golf ball positioned radially inward from the cover, and the cover can be transparent. The marking can be configured to be printed on the cover after the cover receives a pretreatment. As used in this context, the cover is still bare as the marking does not envelope, surround, or otherwise encapsulate the cover. The marking can be formed on the cover via at least one of: hot stamping, UV pad printing, or nitrocellulose ink pad printing.

The cover can have a dimple pattern comprising a plurality of dimples, and an average edge radius among all of the plurality of dimples can be 0.010 inches-0.100 inches. The average edge radius among all of the plurality of dimples can be 0.050 inches-0.070 inches. The cover can have a dimple pattern comprising a plurality of dimples each having an edge angle of 11.0 degrees-14.0 degrees. The edge angle can be 12.0 degrees-13.0 degrees.

In another aspect, a coating free, finished golf ball is provided that consists essentially of a core, and a cover defining an outermost surface of the coating free, finished golf ball such that the cover is bare. The cover is formed from a composition comprising ionomer and a silicone-based cleaning additive or a siloxane-based cleaning additive. The cover can have a dimple pattern comprising a plurality of dimples, and an average edge radius among all of the plurality of dimples is 0.055 inches-0.065 inches. The cover can include at least one marking integrally molded thereon. The cover can have a dimple pattern comprising a plurality of dimples each having an edge angle of 11.0 degrees-14.0 degrees, and more preferably an edge angle of 12.0 degrees-13.0 degrees.

A method of forming a coating free, finished golf ball is also disclosed herein. The method comprises providing a golf ball sub-assembly comprising a core; forming a cover around an outermost surface of the golf ball sub-assembly, the cover being formed from a composition comprising ionomer and at least one of a silicone-based cleaning additive or a siloxane-based cleaning additive; and forming at least one marking directly on the cover via integrally molding the at least one marking into the cover. The method of forming the coating free, finished golf ball does not include any steps that include applying coating layers, such as paint, primer, clear coat, topcoat, etc. After forming the marking on the cover of the golf ball, the golf ball is then suitable for retail and ordinary play.

In another aspect, a coating free, finished golf ball is also provided that includes a core, and a cover defining an outermost surface of the coating free, finished golf ball, such that the cover is bare. The cover is formed from a composition comprising polyurethane, polyurea, or hybrid of polyurethane-polyurea and at least one of: (i) a silicone-based cleaning additive or a siloxane-based cleaning additive; (ii) a gloss-enhancing additive; (iii) a polydimethylsiloxane based soft segment; or (iv) an anatase nano-titanium dioxide (TiO2). The coating free, finished golf ball can further comprise an ionomer casing between the core and the cover.

The composition of the cover can further comprise an ultraviolet absorbing additive. The ultraviolet absorbing additive can be benzotriazole-based. The coating free, finished golf ball can further include at least one marking. The marking can be integrally molded into the cover, such as via a compression molding process. The marking can be disposed on a layer of the golf ball positioned radially inward from the cover, and the cover can be transparent. The marking can be configured to be printed on the cover after the cover receives a pretreatment. The marking can be hot stamped into the cover. The marking can alternatively be formed via UV pad printing or nitrocellulose ink pad printing.

The cover can have a dimple pattern comprising a plurality of dimples, and an average edge radius among all of the plurality of dimples is 0.010 inches-0.100 inches. The cover can have a dimple pattern comprising a plurality of dimples each having an edge angle of 10.0 degrees-15.0 degrees. The edge angle can be 11.0 degrees-12.0 degrees. The core can have a diameter of 1.50 inches-1.60 inches.

In another aspect, a coating free, finished golf ball is provided that consists essentially of: a core; a casing surrounding the core; and a cover defining an outermost surface of the coating free, finished golf ball, such that the cover is bare. The cover is formed from a composition comprising polyurethane, polyurea, or hybrid of polyurethane-polyurea, a silicone-based cleaning additive or a siloxane-based cleaning additive, and an ultraviolet absorbing additive. The cover has a dimple pattern comprising a plurality of dimples, and an average edge radius among all of the plurality of dimples is 0.030 inches-0.050 inches. The cover includes at least one marking formed via at least one of: hot stamping, UV pad printing, or nitrocellulose ink pad printing. In one specific aspect, the marking is formed via hot stamping.

The cover can have a dimple pattern comprising a plurality of dimples each having an edge angle of 11.0 degrees-12.0 degrees. The casing can be formed from ionomer.

In yet another example, a method of forming a coating free, golf ball is provided. The method includes providing a golf ball sub-assembly comprising a core and a casing; forming a cover around an outermost surface of the golf ball sub-assembly, the cover being formed from a composition comprising polyurethane, polyurea, or hybrid of polyurethane-polyurea and at least one of a silicone-based cleaning additive or a siloxane-based cleaning additive; and forming at least one marking directly on the cover via at least one of: hot stamping, UV pad printing, or nitrocellulose ink pad printing. The method of forming the coating free, finished golf ball does not include any steps that require applying coating layers, such as paint, primer, clear coat, topcoat, etc. After forming the marking on the cover of the golf ball, the golf ball is then suitable for retail and ordinary play.

Additional features and aspects of the present disclosure are described in further detail herein.

BRIEF DESCRIPTION OF THE DRAWINGS

Further features and advantages of the present disclosure can be ascertained from the following detailed description that is provided in connection with the drawings described below.

DETAILED DESCRIPTION OF THE INVENTION

Figure 1A:
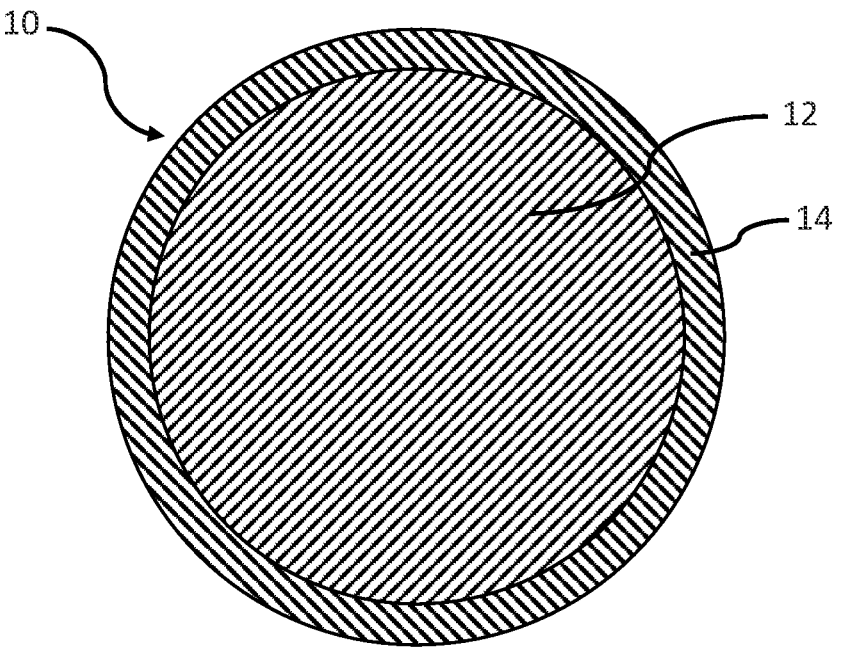
FIG. 1A is a cross-sectional view of a two-piece golf ball in accordance with one example.

According to the disclosed embodiments, a coating free, finished golf ball is provided. The coating free, finished golf ball can have various constructions, such as two, three, four, five, or more piece or layer constructions. The present disclosure can be used for white golf balls or non-white colored golf balls.

In one configuration, the coating free, finished golf ball has a single core and a single cover. In another configuration, the coating free, finished golf ball has a single core and a double cover. In another configuration, the coating free, finished golf ball has a dual core and a single cover.

The cover for the coating free, finished golf ball, which is described in more detail herein, can generally be formed from ionomer or polyurethane, polyurea, or hybrid of polyurethane-polyurea, in some examples. Various other exemplary materials for forming the cover are disclosed herein. Various characteristics of the coating free, finished golf ball are further disclosed herein.

Core Formulations

Concentrations of components are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

Base Rubber

The core rubber formulations of the present disclosure can include a base rubber. In some embodiments, the base rubber may include natural and synthetic rubbers and combinations of two or more thereof. Examples of natural and synthetic rubbers suitable for use as the base rubber include, but are not limited to, polybutadiene, polyisoprene, ethylene propylene rubber (EPR), ethylene-propylene-diene (EPDM) rubber, grafted EPDM rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

For example, the core may be formed from a rubber formulation that includes polybutadiene as the base rubber. Polybutadiene is a homopolymer of 1,3-butadiene. The double bonds in the 1,3-butadiene monomer are attacked by catalysts to grow the polymer chain and form a polybutadiene polymer having a desired molecular weight. Any suitable catalyst may be used to synthesize the polybutadiene rubber depending upon the desired properties. In one embodiment, a transition metal complex (for example, neodymium, nickel, or cobalt) or an alkyl metal such as alkyl lithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. For example, the polybutadiene rubber may have a 1,4 cis-bond content of at least 40 percent. In another embodiment, the polybutadiene rubber has a 1,4 cis-bond content of greater than 80 percent. In still another embodiment, the polybutadiene rubber has a 1,4 cis-bond content of greater than 90 percent. In general, polybutadiene rubbers having a high 1,4 cis-bond content have high tensile strength and rebound.

The polybutadiene rubber may have a relatively high or low Mooney viscosity. Generally, polybutadiene rubbers of higher molecular weight and higher Mooney viscosity have better resiliency than polybutadiene rubbers of lower molecular weight and lower Mooney viscosity. However, as the Mooney viscosity increases, the milling and processing of the polybutadiene rubber generally becomes more difficult. Blends of high and low Mooney viscosity polybutadiene rubbers may be prepared as is described in U.S. Pat. Nos. 6,982,301 and 6,774,187, the disclosures of which are hereby incorporated by reference, and used in accordance with the present disclosure. In general, the lower limit of Mooney viscosity may be about 30 or 35 or 40 or 45 or 50 or 55 or 60 or 70 or 75 and the upper limit may be about 80 or 85 or 90 or 95 or 100 or 105 or 110 or 115 or 120 or 125 or 130. For example, the polybutadiene used in the rubber formulation may have a Mooney viscosity of about 30 to about 80 or about 40 to about 60.

Examples of commercially available polybutadiene rubbers that can be used in rubber formulations in accordance with the present disclosure, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR-Nd Group II and Group III, available from Nizhnekamskneftekhim, Inc. of Nizhnekamsk, Tartarstan Republic.

In another embodiment, the core is formed from a rubber formulation including butyl rubber. Butyl rubber is an elastomeric copolymer of isobutylene and isoprene. Butyl rubber is an amorphous, non-polar polymer with good oxidative and thermal stability, good permanent flexibility, and high moisture and gas resistance. Generally, butyl rubber includes copolymers of about 70 percent to about 99.5 percent by weight of an isoolefin, which has about 4 to 7 carbon atoms, for example, isobutylene, and about 0.5 percent to about 30 percent by weight of a conjugated multiolefin, which has about 4 to 14 carbon atoms, for example, isoprene. The resulting copolymer contains about 85 percent to about 99.8 percent by weight of combined isoolefin and about 0.2 percent to about 15 percent of combined multiolefin. A commercially available butyl rubber suitable for use in rubber formulations in accordance with the present disclosure includes Bayer Butyl 301 manufactured by Bayer AG.

The rubber formulations may include a combination of two or more of the above-described rubbers as the base rubber. In some embodiments, the rubber formulation of the present disclosure includes a blend of different polybutadiene rubbers. In this embodiment, the rubber formulation may include a blend of a first polybutadiene rubber and a second polybutadiene rubber in a ratio of about 5:95 to about 95:5. For example, the rubber formulation may include a first polybutadiene rubber and a second polybutadiene rubber in a ratio of about 10:90 to about 90:10 or about 15:85 to about 85:15 or about 20:80 to about 80:20 or about 30:70 to about 70:30 or about 40:60 to about 60:40. In other embodiments, the rubber formulation may include a blend of more than two polybutadiene rubbers or a blend of polybutadiene rubber(s) with any of the other elastomers discussed above.

In other embodiments, the rubber formulation used to form the core can include a blend of polybutadiene and butyl rubber. In this embodiment, the rubber formulation may include a blend of polybutadiene and butyl rubber in a ratio of about 10:90 to about 90:10. For example, the rubber formulation may include a blend of polybutadiene and butyl rubber in a ratio of about 10:90 to about 90:10 or about 20:80 to about 80:20 or about 30:70 to about 70:30 or about 40:60 to about 60:40. In other embodiments, the rubber formulation may include polybutadiene and/or butyl rubber in a blend with any of the other elastomers discussed above.

In further embodiments, the rubber formulation used to form the core can include a blend of polybutadiene and EPDM rubber or grafted EPDM rubber as the base rubber. In still further embodiments, the rubber formulations may include a combination of polybutadiene rubber and EPDM rubber as the base rubber. In this embodiment, the EPDM may be included in the rubber formulation in an amount of about 0.1 to about 20 or about 1 to about 15 or about 3 to about 10 parts by weight per 100 parts of the total rubber. For example, EPDM may be included in the rubber formulation in an amount of about 5 parts by weight per 100 parts of the total rubber. In still further embodiments, the core formulations may combine EPDM rubber and two or more different types of polybutadiene rubber, such as two or more different types of high cis-1,4 polybutadiene, as the base rubber.

The rubber formulations include the base rubber in an amount of 100 phr. That is, when more than one rubber component is used in the rubber formulation as the base rubber, the sum of the amounts of each rubber component should total 100 phr. In some embodiments, the rubber formulations include polybutadiene rubber as the base rubber in an amount of 100 phr. In other embodiments, the rubber formulations include polybutadiene rubber and a second rubber component. In this embodiment, the polybutadiene rubber may be used in an amount of about 80 to about 99.9 parts by weight per 100 parts of the total rubber and the second rubber component may be used in an amount of about 0.1 to about 20 parts by weight per 100 parts of the total rubber.

In further embodiments, the polybutadiene rubber may be used in an amount of about 85 to about 99 parts by weight per 100 parts of the total rubber and the second rubber component may be used in an amount of about 1 to about 15 parts by weight per 100 parts of the total rubber.

In yet other embodiments, the polybutadiene rubber may be used in an amount of about 90 to about 97 parts by weight per 100 parts of the total rubber and the second rubber component may be used in an amount of about 3 to about 10 parts by weight per 100 parts of the total rubber.

In still further embodiments, the polybutadiene rubber may be used in an amount of about 94 to about 96 parts by weight per 100 parts of the total rubber and the second rubber component may be used in an amount of about 4 to about 6 parts by weight per 100 parts of the total rubber.

The base rubber may be used in the rubber formulation in an amount of at least about 5 percent by weight based on total weight of the rubber formulation. In some embodiments, the base rubber is included in the rubber formulation in an amount within a range having a lower limit of about 10 percent or 20 percent or 30 percent or 40 percent or 50 percent or 55 percent and an upper limit of about 60 percent or 70 percent or 80 percent or 90 percent or 95 percent or 100 percent. For example, the base rubber may be present in the rubber formulation in an amount of about 30 percent to about 80 percent by weight based on the total weight of the rubber formulation. In another example, the rubber formulation includes about 40 percent to about 70 percent base rubber based on the total weight of the rubber formulation.

Crosslinking Co-agent

The rubber formulations can further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. In one embodiment, the co-agent is one or more metal salts of acrylates, diacrylates, methacrylates, and dimethacrylates, wherein the metal is selected from magnesium, calcium, zinc, aluminum, lithium, and nickel. In another embodiment, the co-agent includes one or more zinc salts of acrylates, diacrylates, methacrylates, and dimethacrylates. For example, the co-agent may be zinc diacrylate (ZDA). In another embodiment, the co-agent may be zinc dimethacrylate (ZDMA). An example of a commercially available zinc diacrylate includes Dymalink® 526 manufactured by Cray Valley.

The co-agent may be included in the rubber formulation in varying amounts depending on the desired characteristics of the golf ball core. For example, the co-agent may be used in an amount of about 5 to about 50 or about 10 to about 45 or about 15 to about 40 parts by weight per 100 parts of the total rubber. In one embodiment, the rubber formulation of the core includes about 35 to about 48 parts by weight co-agent per 100 parts of the total rubber. In another embodiment, the rubber formulation includes about 38 to about 45 or about 39 to about 42 parts by weight co-agent per 100 parts of total rubber. In another embodiment, the co-agent is included in the rubber formulation of the core in an amount of about 29 to about 37 or about 31 to about 35 parts by weight per 100 parts of the total rubber. In still another embodiment, the rubber formulation includes about 25 to about 33 or about 27 to about 31 parts by weight co-agent per 100 parts of the total rubber. In yet another example, the co-agent may be used in an amount of about 20-40 parts by weight per 100 parts of the total rubber. In one example, the co-agent is used in an amount of about 30-35 parts by weight per 100 parts of the total rubber. In one example, the co-agent is used in an amount of about 32-33 parts by weight per 100 parts of the total rubber.

Free Radical Initiator

The core formulations may include a free radical initiator selected from an organic peroxide, a high energy radiation source capable of generating free radicals, or a combination thereof. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BD-FF, commercially available from Akzo Nobel. In other embodiments, the free radical initiator is dimethyl terbutyl peroxide, including, but not limited to Trigonox® 101-50D-PD, commercially available from Nouryon.

Free radical initiators may be present in the rubber formulation in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubber, and an upper limit of 2.5 parts or 3 parts or 5 parts or 6 parts or 10 parts or 15 parts by weight per 100 parts of the total rubber. For example, the rubber formulation may include peroxide free radical initiators in an amount of about 0.1 to about 10 or about 0.5 to about 6 or about 1 to about 5 parts by weight per 100 parts of the total rubber. In another example, the rubber formulation may include peroxide free radical initiators in an amount of about 0.5 to about 2 or about 0.7 to about 1.8 or about 0.8 to about 1.2 or about 1.3 to about 1.7 parts by weight per 100 parts of the total rubber. In yet another example, the rubber formulation may include peroxide free radical initiators in an amount of about 1.5 to about 3 or about 1.7 to about 2.8 or about 1.8 to about 2.2 or about 2.3 to about 2.7 parts by weight per 100 parts of the total rubber.

Additives

Radical scavengers such as a halogenated organosulfur, organic disulfide, or inorganic disulfide compounds may also be added to the rubber formulation. In one embodiment, a halogenated organosulfur compound included in the rubber formulation includes, but is not limited to, pentachlorothiophenol (PCTP) and salts of PCTP such as zinc pentachlorothiophenol (ZnPCTP). In another embodiment, ditolyl disulfide, diphenyl disulfide, dixylyl disulfide, 2-nitroresorcinol, and combinations thereof are added to the rubber formulation. An example of a commercially available radical scavenger includes Rhenogran® Zn-PTCP-72 manufactured by Rheine Chemie. The radical scavenger may be included in the rubber formulation in an amount of about 0.3 to about 1.0 part by weight per 100 parts of the total rubber. In one embodiment, the rubber formulation may include about 0.4 to about 0.9 parts by weight radical scavenger per 100 parts of the total rubber. In another embodiment, the rubber formulation may include about 0.5 to about 0.8 parts by weight radical scavenger per 100 parts of the total rubber. In another embodiment, the rubber formulation may include about 0.3 parts to about 0.4 parts by weight radical scavenger per 100 parts of the total rubber.

Fillers

Suitable non-limiting examples of fillers include carbon black, clay and nanoclay particles, talc, glass (e.g., glass flake, milled glass, and microglass), mica and mica-based pigments (e.g., Iriodin® pearl luster pigments from The Merck Group), and combinations thereof. Metal oxide and metal sulfate fillers are also contemplated for inclusion in the rubber formulation. Suitable metal fillers include, for example, particulate, powders, flakes, and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof. Suitable metal oxide fillers include, for example, zinc oxide, iron oxide, aluminum oxide, titanium oxide, magnesium oxide, and zirconium oxide. Suitable metal sulfate fillers can include, for example, barium sulfate and/or strontium sulfate. An example of a commercially available barium sulfate filler includes PolyWate® 325 manufactured by Cimbar Performance Minerals.

When included, the fillers may be in an amount of about 1 to about 25 parts by weight per 100 parts of the total rubber. In one embodiment, the rubber formulation includes at least one filler in an amount of about 5 to about 20 or about 8 to about 15 parts by weight per 100 parts of the total rubber. In another embodiment, the rubber formulation includes at least one filler in an amount of about 8 to about 14 or about 10 to about 12 parts by weight per 100 parts of the total rubber. In yet another embodiment, the rubber formulation includes at least one filler in an amount of about 10 to about 17 or about 12 to about 15 parts by weight per 100 parts of the total rubber. In yet another embodiment, the rubber formulation includes at least one filler in an amount of about 10 to about 16 or about 12 to about 15 parts by weight per 100 parts of the total rubber. In a further embodiment, the rubber formulation includes at least one filler in an amount of about 12 to about 18 or about 14 to about 16 parts by weight per 100 parts of the total rubber. In one example, the filler is added to weight for a specific gravity, and the exact values can vary depending on the specific gravity of a specific rubber batch.

In some aspects, the amount of filler and/or cure modifier in the rubber formulation may be altered based on the compound, and the particular isomer of the compound, used as the hardening agent. For example, when the rubber formulation includes 2-nitrophenol, at least one filler and/or cure modifier may be included in the rubber formulation in amount from about 9 to about 13 parts by weight per 100 parts of the total rubber. In another example, when the rubber formulation includes 3-nitrophenol, the filler and/or cure modifier may be included in the rubber formulation in amount from about 11 to about 16 parts by weight per 100 parts of the total rubber. In yet another example, when the rubber formulation includes 4-nitrophenol, the filler and/or cure modifier may be included in the rubber formulation in amount from about 13 to about 17 parts by weight per 100 parts of the total rubber.

In some embodiments, more than one type of filler may be included in the rubber formulation. For example, the rubber formulation may include a first filler in an amount from about 5 to about 20 or about 8 to about 17 parts by weight per 100 parts total rubber and a second filler in an amount from about 1 to about 10 or about 3 to about 7 parts by weight per 100 parts total rubber. In another example, the rubber formulation may include a first filler in an amount from about 7 to about 13 or about 9 to about 12 parts by weight per 100 parts total rubber and a second filler in an amount from about 2 to about 8 or about 4 to about 6 parts by weight per 100 parts total rubber. In yet another example, the rubber formulation may include a first filler in an amount from about 10 to about 15 or about 13 to about 14 parts by weight per 100 parts total rubber and a second filler in an amount from about 2 to about 9 or about 3 to about 7 parts by weight per 100 parts total rubber. In a further example, the rubber formulation may include a first filler in an amount from about 10 to about 15 or about 13 to about 14 parts by weight per 100 parts total rubber and a second filler in an amount from about 13 to about 18 or about 14 to about 16 parts by weight per 100 parts total rubber.

Antioxidants, processing aids, accelerators (for example, tetra methylthiuram), dyes and pigments, wetting agents, surfactants, plasticizers, coloring agents, fluorescent agents, chemical blowing and foaming agents, defoaming agents, stabilizers, softening agents, impact modifiers, antiozonants, as well as other additives known in the art, may also be added to the rubber formulation. Examples of suitable processing aids include, but are not limited to, high molecular weight organic acids and salts thereof. Suitable organic acids are aliphatic organic acids, aromatic organic acids, saturated mono-functional organic acids, unsaturated mono-functional organic acids, multi-unsaturated mono-functional organic acids, and dimerized derivatives thereof. In one embodiment, the organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof.

Curing the Core Formulation

The rubber, hardening agent, cross-linking agent, free radical initiator, fillers, and any other materials used in forming the core, in accordance with the present disclosure, may be combined to form a mixture by any type of mixing known to one of ordinary skill in the art. Suitable types of mixing include single pass and multi-pass mixing, and the like. A single pass mixing process where ingredients are added sequentially can be used because this type of mixing tends to increase efficiency and reduce costs for the process. In embodiments where a free-radical initiator is used, it may be desirable to combine the hardening agent into the rubber formulation prior to adding the free-radical initiator.

The rubber formulation may be cured using conventional curing processes. Non-limiting examples of curing processes suitable for use in accordance with the present disclosure include peroxide-curing, sulfur-curing, high-energy radiation, and combinations thereof.

The golf balls of the present disclosure may be formed using a variety of application techniques. For example, the golf ball, golf ball core, or any layer of the golf ball may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. In this aspect, cover layers may be formed over the core using any suitable technique that is associated with the material used to form the layer. Preferably, each cover layer is separately formed over the core. For example, an ethylene acid copolymer ionomer composition may be directly injection-molded to produce an inner cover layer via retractable pin injection molding. Alternatively, the ionomer composition can be injection molded into hollow half spherical shells and placed about the core. This subassembly can then be placed into a compression mold and molded under sufficient pressure, temperature, and time to produce the ionomeric inner cover layer. An outer cover layer including a polyurethane or polyurea composition over the ball sub-assembly may be formed by using a casting process.

The rubber formulations discussed above are suitable for use in the core or one or more of the core layers if multiple core layers are present. It is also contemplated that the rubber formulations disclosed herein may be used to form one or more of the layers of any of the one, two, three, four, or five, or more-piece (layered) balls described above. That is, any of the core layers, intermediate layers, and/or cover layers may comprise the rubber formulation of this disclosure. The rubber formulations of different layers may be the same or different. The diameter and thickness of the different layers along with properties such as hardness and compression may vary depending upon the construction and desired playing performance properties of the golf ball.

Cover

In one aspect, different materials may be used in the construction of the intermediate and cover layers of golf balls according to the present disclosure. For example, a variety of materials may be used for forming the outer cover including, for example, polyurethanes; polyureas; copolymers, blends and hybrids of polyurethane and polyurea; olefin-based copolymer ionomer resins; polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer; cross-linked trans-polyisoprene and blends thereof; polyester-based thermoplastic elastomers; polyurethane-based thermoplastic elastomers; synthetic or natural vulcanized rubber; and combinations thereof.

In one embodiment, the cover is formed from a polyurethane, polyurea, or hybrid of polyurethane-polyurea. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

Exemplary thermoset materials for the outer cover layer (and any other layer so treated) include, but are not limited to: (1) thermoset polyurethanes, such as those prepared from polyols and diisocyanates or polyisocyanates and/or their prepolymers, and those disclosed in U.S. Pat. Nos. 5,334, 673 and 6,506,851 (both of which are fully incorporated by reference as if fully set forth herein); (2) thermoset polyureas, such as those disclosed in U.S. Pat. Nos. 5,484,870 and 6,835,794 (both of which are fully incorporated by reference as if fully set forth herein); and (3) thermoset polyurethane-urea hybrids, blends or copolymers comprising urethane and urea segments.

Suitable polyurethane compositions comprise a reaction product of at least one polyisocyanate and at least one curing agent. The curing agent can include, for example, one or more polyamines, one or more polyols, or a combination thereof. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent. Suitable polyurethanes are described in U.S. Patent Application Publication No. 2005/0176523, which is fully incorporated by reference as if fully set forth herein.

Any polyisocyanate available to one of ordinary skill in the art is suitable for use according to the present disclosure. Exemplary polyisocyanates include, but are not limited to, 4,4'-diphenylmethane diisocyanate (MDI); polymeric MDI; carbodiimide-modified liquid MDI; 4,4'-dicyclohexylmethane diisocyanate (H12MDI); p-phenylene diisocyanate (PPDI); m-phenylene diisocyanate (MPDI); toluene diisocyanate (TDI); 3,3'-dimethyl-4,4'-biphenylene diisocyanate; isophoronediisocyanate; 1,6-hexamethylene diisocyanate (HDI); naphthalene diisocyanate; xylene diisocyanate; p-tetramethylxylene diisocyanate; m-tetramethylxylene diisocyanate; ethylene diisocyanate; propylene-1,2-diisocyanate; tetramethylene-1,4-diisocyanate; cyclohexyl diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate; tetracene diisocyanate; napthalene diisocyanate; anthracene diisocyanate; isocyanurate of toluene diisocyanate; uretdione of hexamethylene diisocyanate; and mixtures thereof. Polyisocyanates are known to those of ordinary skill in the art as having more than one isocyanate group, e.g., di-isocyanate, tri-isocyanate, and tetra-isocyanate. Preferably, the polyisocyanate includes MDI, PPDI, TDI, or a mixture thereof, and more preferably, the polyisocyanate includes MDI. It should be understood that, as used herein, the term MDI includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer isocyanate groups. Examples of "low free monomer" diisocyanates include, but are not limited to Low Free Monomer MDI, Low Free Monomer TDI, and Low Free Monomer PPDI.

The at least one prepolymer can have less than about 14% unreacted NCO groups, or less than 9% unreacted NCO groups, or less than 8.5% unreacted NCO groups, or less than 8% unreacted NCO groups, or less than 7.5% unreacted NCO groups, or less than 7% unreacted NCO groups, or less than 6.5% unreacted NCO groups, or less than 6% unreacted NCO groups, or less than 5.5% unreacted NCO groups, or less than 5% unreacted NCO groups. In one example, the at least one prepolymer has no greater than about 8.0% NCO, or no greater than about 7.5% NCO, or no greater than about 7.0% NCO, or no greater than 6.5% NCO or 6.0% NCO or 5.5% NCO or 5.0% NCO. In one example, the at least one prepolymer has 6.5% NCO. In another example, the at least one prepolymer has 5.6% NCO. In another example, the at least one prepolymer has 5.9% NCO. In another example, the at least one prepolymer has 6.1% NCO.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol can include PTMEG.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, polycarbonate polyols are included in the polyurethane material of the present disclosure. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the present disclosure and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline; m-phenylenediamine; 4,4'-methylene-bis-(2-chloroaniline); 4,4'-methylene-bis-(2,6-diethylaniline); 4,4'-methylene-bis-(2,3-dichloroaniline); 4,4'-diamino-3,3'-diethyl-5,5'-dimethyl diphenylmethane; 2,2', 3,3'-tetrachloro diamino diphenylmethane; trimethylene glycol di-p-aminobenzoate; and mixtures thereof. In one example, the curing agent includes 3,5-dimethylthio-2,4-toluenediamine and isomers thereof, such as ETHACURE® 300, commercially available from Albermarle Corporation of Baton Rouge, LA. In another example, the curing agent includes 3,5-diethyltoluene-2,4-diamine and 3,5-diethyltoluene-2,6-diamine, such as ETHACURE® 100 from Albermarle Corporation of Baton Rouge, LA.

Suitable polyamine curatives, which include both primary and secondary amines, preferably have molecular weights ranging from about 64 to about 2000. At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy) ethoxy]benzene; 1,3-bis-12-[2-(2- hydroxyethoxy) ethoxy]thoxy}benzene; 1,4-butanediol; 1,5-pentanediol; 1,6-hexanediol; resorcinol-di-(β-hydroxyethyl) ether; hydroquinone-di-(β-hydroxyethyl) ether; and mixtures thereof. Preferred hydroxy-terminated curatives include 1,3-bis(2-hydroxyethoxy) benzene; 1,3-bis-[2-(2-hydroxyethoxy) ethoxy]benzene; 1,3-bis-{2-[2-(2-hydroxyethoxy) ethoxy]ethoxy}benzene; 1,4-butanediol, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In one aspect of the present disclosure, saturated polyurethanes are used to form one or more of the cover layers, preferably the outer cover layer, selected from castable thermoset polyurethanes. In this embodiment, the saturated polyurethanes are substantially free of aromatic groups or moieties. Saturated polyurethanes are a product of a reaction between at least one polyurethane prepolymer and at least one saturated curing agent. The polyurethane prepolymer is a product formed by a reaction between at least one saturated polyol and at least one saturated diisocyanate. As is well known in the art, a catalyst may be employed to promote the reaction between the curing agent and the isocyanate and polyol, or the curing agent and the prepolymer.

Saturated diisocyanates which can be used include, without limitation, ethylene diisocyanate; propylene-1,2-diisocyanate; tetramethylene-1,4-diisocyanate; 1,6-hexamethylene-diisocyanate (HDI); 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate; methyl cyclohexylene diisocyanate; triisocyanate of HDI; triisocyanate of 2,2,4-trimethyl-1,6-hexane diisocyanate; and homopolymers or copolymers of the above. The most preferred saturated diisocyanates are 4,4'-dicyclohexylmethane diisocyanate and isophorone diisocyanate.

Saturated polyols can include, without limitation, polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol-initiated polycaprolactone, 1,4-butanediol-initiated polycaprolactone, 1,6-hexanediol-initiated polycaprolactone; trimethylol propane-initiated polycaprolactone, neopentyl glycol initiated polycaprolactone, and polytetramethylene ether glycol-initiated polycaprolactone. Suitable saturated polyols are polytetramethylene ether glycol and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine; ethylene diamine; diethylene triamine; triethylene tetramine; tetraethylene pentamine; 4,4'-dicyclohexylmethane diamine; 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino) cyclohexane; 1,4-bis-(sec-butylamino) cyclohexane; isophorone diamine;

hexamethylene diamine; propylene diamine; 1-methyl-2, 4-cyclohexyl diamine; 1-methyl-2,6-cyclohexyl diamine; 1,3-diaminopropane; dimethylamino propylamine; diethylamino propylamine; imido-bis-propylamine; isomers and mixtures of isomers of diaminocyclohexane; monoethanolamine; diethanolamine; triethanolamine; monoisopropanolamine; and diisopropanolamine. In one example, the saturated curatives can be 1,4-butanediol, 1,4-cyclohexyldimethylol and 4,4'-bis-(sec-butylamino)-dicyclohexylmethane.

Alternatively, other suitable polymers include partially or fully neutralized ionomer, metallocene, or other single-site catalyzed polymer, polyester, polyamide, non-ionomeric thermoplastic elastomer, copolyether-esters, copolyether-amides, polycarbonate, polybutadiene, polyisoprene, polystryrene block copolymers (such as styrene-butadiene-styrene), styrene-ethylene-propylene-styrene, styrene-ethylene-butylene-styrene, and the like, and blends thereof.

Thermosetting polyurethanes or polyureas or hybrids thereof are suitable for the outer cover layers of the golf ball.

There are two basic techniques that can be used to make the polyurethanes: a) one-shot technique, and b) prepolymer technique. In the one-shot technique, the diisocyanate, polyol, and hydroxyl-terminated chain-extender (curing agent) are reacted in one step. On the other hand, the prepolymer technique involves a first reaction between the diisocyanate and polyol compounds to produce a polyurethane prepolymer, and a subsequent reaction between the prepolymer and hydroxyl-terminated chain-extender. As a result of the reaction between the isocyanate and polyol compounds, there will be some unreacted NCO groups in the polyurethane prepolymer. The prepolymer can have less than 14% unreacted NCO groups. In one specific example, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Conventional and non-conventional materials may be used for forming intermediate layers of the ball including, for instance, ionomer resins, highly neutralized polymers, polybutadiene, butyl rubber, and other rubber-based core formulations, and the like. In one embodiment, the inner cover layer, i.e., the layer disposed between the core and the outer cover, includes an ionomer. In this aspect, ionomers suitable for use in accordance with the present disclosure may include partially neutralized ionomers and highly neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70 percent of all acid groups present in the composition are neutralized.

Exemplary ionomers are salts of O/X- and O/X/Y-type acid copolymers, wherein O is an α-olefin, X is a $C_3$-$C_8$α, β-ethylenically unsaturated carboxylic acid, and Y is a softening monomer. O can be selected from ethylene and propylene. X can be selected from methacrylic acid, acrylic acid, ethacrylic acid, crotonic acid, and itaconic acid. Methacrylic acid and acrylic acid are particularly preferred. Y can be selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α, B-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$α, β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer may be at least about 15 weight percent, at least about 25 weight percent, at least about 40 weight percent, or at least about 60 weight percent, based on total weight of the copolymer. The amount of $C_3$ to $C_8$α, β-ethylenically unsaturated mono- or dicarboxylic acid in the acid copolymer is typically from 1 weight percent to 35 weight percent, from 5 weight percent to 30 weight percent, from 5 weight percent to 25 weight percent, or from 10 weight percent to 20 weight percent, based on total weight of the copolymer. The amount of optional softening comonomer in the acid copolymer may be from 0 weight percent to 50 weight percent, from 5 weight percent to 40 weight percent, from 10 weight percent to 35 weight percent, or from 20 weight percent to 30 weight percent, based on total weight of the copolymer.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals. The amount of cation used in the composition is readily determined based on desired level of neutralization. As disclosed above, for HNP compositions, the acid groups are neutralized to 70 percent or greater, 70 to 100 percent, or 90 to 100 percent. In one embodiment, an excess amount of neutralizing agent, that is, an amount greater than the stoichiometric amount needed to neutralize the acid groups, may be used. That is, the acid groups may be neutralized to 100 percent or greater, for example 110 percent or 120 percent or greater. In other embodiments, partially neutralized compositions are prepared, wherein 10 percent or greater, normally 30 percent or greater of the acid groups are neutralized. When aluminum is used as the cation source, it is preferably used at low levels with another cation such as zinc, sodium, or lithium, since aluminum has a dramatic effect on melt flow reduction and cannot be used alone at high levels. For example, aluminum is used to neutralize about 10 percent of the acid groups and sodium is added to neutralize an additional 90 percent of the acid groups.

"Low acid" and "high acid" ionomeric polymers, as well as blends of such ionomers, may be used. In general, low acid ionomers are considered to be those containing 16 weight percent or less of acid moieties, whereas high acid ionomers are considered to be those containing greater than 16 weight percent of acid moieties. In one embodiment, the inner cover layer is formed from a composition comprising a high acid ionomer. A suitable high acid ionomer is Surlyn® 8150 (Dow), which is a copolymer of ethylene and methacrylic acid, having an acid content of 19 weight percent, 45 percent neutralized with sodium. In another embodiment, the inner cover layer is formed from a composition comprising a high acid ionomer and a maleic anhydride-grafted non-ionomeric polymer. An example of a suitable maleic anhydride-grafted polymer is Fusabond® N525 (Dow), which is a maleic anhydride-grafted, metallocene-catalyzed ethylene-butene copolymer having about 0.9 weight percent maleic anhydride grafted onto the copolymer. Blends of high acid ionomers with maleic anhydride-grafted polymers are further disclosed, for example, in U.S. Pat. Nos. 6,992,135 and 6,677,401, the entire disclosures of which are incorporated herein by reference.

When used to form an inner cover layer, the base polymer may include a composition comprising a 50/45/5 blend of Surlyn® 8940/Surlyn® 9650/Nucrel® 960. In this aspect, the composition may have a material hardness of from 80 to 85 Shore C. In another embodiment, the inner cover layer is formed from a composition comprising a 50/25/25 blend of Surlyn® 8940/Surlyn® 9650/Surlyn® 9910, having a material hardness of about 85 to 95 Shore C. In yet another embodiment, the inner cover layer is formed from a composition comprising a 50/50 blend of Surlyn® 8940/Surlyn® 9650, having a material hardness of about 82 to 90 Shore C. A composition comprising a 50/50 blend of Surlyn® 8940 and Surlyn® 7940 also may be used. Any of these compositions can be used to form a single cover layer. A composition comprising a blend of Surlyn® 7940 and Surlyn® 8945 may be used to form the cover, or a component of the cover. A composition comprising a blend of Surlyn® 7940, Surlyn® 8945, Nucrel® 960, and Fusabond® N525 also may be used.

In another aspect, adhesion promoters can be applied to any one or more of the outer surfaces or inner surfaces of the layers disclosed herein. For example, an adhesion promoter can be applied between a casing layer and a cover layer. In one other example, a corona treatment can be used to promote adhesion between the cover and casing layer. In other aspects, moisture vapor barrier treatments can also be applied to any one or more of the layers disclosed herein. The adhesion promoter and/or moisture vapor barrier treatments are not applied to the outer surface of the cover.

Various additions, additives, substances, chemicals, solutions, and other compositions can be integrated with the cover composition or formulations described herein to address issues typically associated with dirt accumulation for uncoated golf balls. Exemplary compositions and solutions for modifying known cover formulations are described herein.

In one aspect, the cover composition includes at least one of: (i) a silicone-based cleaning additive or a siloxane-based cleaning additive; (ii) a gloss-enhancing additive; (iii) a polydimethylsiloxane based soft segment; or (iv) an anatase nano-titanium dioxide ($TiO_2$). In one example, any one or more of these additions to the cover composition can be incorporated via a masterbatch or an extruder, such as a single or twin screw extruder. The twin screw extruder can be configured to incorporate the additive(s) into the cover composition, in one example. In another example, a masterbatch containing the additives could be provided, and the masterbatch and base material for the cover composition can be dry blended before forming the cover. One of ordinary skill in the art would understand that various blending or mixing techniques could be used.

Regarding silicone-based or siloxane-based cleaning additives, some exemplary materials can include BYK®-SILCLEAN from BYK-Chemie GmbH (i.e., BYK®-SILCLEAN 3700; BYK®-SILCLEAN 3701; BYK®-SILCLEAN 3710; BYK®-SILCLEAN 3720). In one aspect, the silicone-based or siloxane-based cleaning additive can be at least one of: OH-functional silicone modified with polyacrylate; epoxy-functional polydimethylsiloxane; polyether-modified, acryl-functional polydimethylsiloxane; polyether-modified, hydroxy-functional polydimethylsiloxane; or amine-functional polydimethylsiloxane. One of ordinary skill in the art would understand that this list of possible compositions is non-exhaustive and other silicone-based or siloxane-based cleaning additives are known to those of ordinary skill in the art. These materials are generally silicone-based or siloxane-based and have functional groups that can be reacted into the cover material to maintain the effectiveness of the anti-graffiti or anti-dirt action. For example, BYK®-SILCLEAN 3700 is hydroxy functional and can be reacted into a polyurethane cover system at a loading of about 3%-6% on total weight, as supplied. The hydroxyl group on the BYK®-SILCLEAN 3700 can be reacted with the isocyanates in the polyurethane formulation either during the formation of the prepolymer or in the final curing step. In another example, BYK®-SILCLEAN 3710 is an acryl functional polydimethylsiloxane that can grafted onto a polymer backbone or can be co-reacted with into a polyethylene/acid copolymer. In either case, these silicone-based or siloxane-based materials are permanent, do not migrate, and maintain their effectiveness for long periods of time (i.e., the useful or expected lifetime of a golf ball). One of ordinary skill in the art would understand that other anti-graffiti, anti-debris, and/or anti-dirt solutions or materials could be used.

In another aspect, the cover of the coating free, finished golf ball can comprise gloss enhancers or a gloss-enhancing additive. These additives can provide gloss improvement and increased slip. In some examples, these additives are fatty acid amides, fatty acid esters, metal stearates, and/or waxes. These additives can be configured to migrate to the surface and lubricate the cover surface. The gloss enhancers or a gloss-enhancing additive can include at least one of: polyether siloxane copolymer; polyether-modified polysiloxane; polyacrylate; or low density polyethylene wax. One of ordinary skill in the art would understand that this list of possible compositions is non-exhaustive and other gloss enhancers or a gloss-enhancing additives are known to those of ordinary skill in the art. Exemplary gloss enhancers or gloss-enhancing additives are commercially available. For example, one known gloss-enhancing additive is Incroslip™ SL from Croda International plc. Another exemplary gloss-enhancing additive includes TEGO® Glide 450 from Evonik Operations GmbH. Other exemplary gloss-enhancing additive include BYK®-350 and BYK®-359 from BYK-Chemie GmbH. One of ordinary skill in the art would understand that various gloss improvement solutions could be used. In another aspect, pigment dispersants and/or flow enhancers could be used.

In other examples, the cover of the coating free, finished golf ball can include soft segments, such as silicone-based soft segments. One such example includes GP-426 from Genesee Polymers Corporation, which has a 3,400 amu molecular weight and is a hydroxyl terminated polydimethylsiloxane. In one aspect, the silicone-based soft segments can include at least one of: hydroxyl terminated polydimethylsiloxane; dimethyl polysiloxane; silicone or siloxane based polyether or polyester polyol; or amine-terminated polydimethylsiloxane. One of ordinary skill in the art would understand that this list of possible compositions is non-exhaustive and other silicone-based soft segments are known to those of ordinary skill in the art. This material can be reacted with excess isocyanate to produce a prepolymer that can then be reacted to form a cast golf ball cover. One of ordinary skill in the art would understand that a single type of soft segment or multiple soft segments can be used in the cover of the coating free, finished golf ball. For example, a first soft segment, such as GP-426, can be used in conjunction with a second soft segment, such as PTMEG, polycaprolactone, etc. Based on the siloxane functionality, a hydrophobic effect is provided that promotes slippage of dirt, debris, or other matter from the cover of the coating free, finished golf ball. When the coating free, finished golf ball is exposed to water, the water will bead up and wash away carrying any dirt with it thereby maintaining a clean cover during usage of the coating free, finished golf ball.

In another example, the cover of the coating free, finished golf ball can include photocatalytic compositions or solutions, such as titanium dioxide (TiO2). The photocatalytic composition, which can include an anatase nano-titanium dioxide, is configured to change energy states when exposed to UV light. When incorporated into the base cover material, this additive is configured to cause the surface energy to change, thereby creating a more hydrophobic surface. Based on this aspect, water and other fluids tend to bead up and carry dirt away with it thereby maintaining a clean cover during usage of the coating free, finished golf ball. In one example, nano-titanium dioxide can be reacted with 2,2-bis (hydroxymethyl)propionic acid. This adduct material can then be used as a chain extender in a polyurethane composition, for example. In one example, the titanium dioxide can be anatase. One of ordinary skill in the art would understand that other forms of titanium dioxide, such as brookite or rutile can be used. In one aspect, photocatalytic compositions or solutions, such as titanium dioxide, can be used to convert the surface of the coating free, finished golf ball from moderate hydrophilicity to ultra or super hydrophilic. In yet another aspect, photocatalysts besides titanium dioxide can be used, such as zinc oxide, silver, or other materials. In one aspect, the anatase nano-titanium dioxide is provided in powder form.

In one aspect, the anatase nano-titanium dioxide has a particle size of no greater than 25 nm. In one aspect, the anatase nano-titanium dioxide has a particle size of no greater than 50 nm. In another aspect, the anatase nano-titanium dioxide has a particle size of no greater than 100 nm.

In one aspect, the anatase nano-titanium dioxide is provided at a total loading of no greater than 1% in the cover formulation. In another aspect, the anatase nano-titanium dioxide is provided at a total loading of no greater than 2% in the cover formulation. In another aspect, the anatase nano-titanium dioxide is provided at a total loading of no greater than 1%-10% in the cover formulation. In another aspect, the anatase nano-titanium dioxide is provided at a total loading of no greater than 5% in the cover formulation.

The anatase nano-titanium dioxide functions as a photocatalyst in one aspect due to the coordination or bonding that can occur between the anatase nano-titanium dioxide and an associated organic compound. The anatase nano-titanium dioxide can be configured to alter its electronic nature or state such that when exposed to UV light, the compound can act as a semiconductor and electrons can transfer, thereby causing a physical and chemical change to the compound. In one aspect, the anatase nano-titanium dioxide can be configured to provide a hydrophilic surface.

One of ordinary skill in the art would understand that the anatase nano-titanium dioxide can be coordinated with various carboxylic containing materials. Some exemplary carboxylic containing materials include: saturated or unsaturated fatty acids, such as palmitic acid, stearic acid or oleic acid; polymers or ionomers based on ethylene methacrylic acid copolymers or ethylene acrylic acid copolymers; or any other organic acid. In one example, the anatase nano-titanium dioxide can be configured to accept electron pairs from various carboxylic acid groups. In one example, the carboxylic acid group can be dimethylolpropionic acid (DMPA). The anatase nano-titanium dioxide can be configured to coordinate with carboxylic acid groups in the ionomer that are not already participating in the metal interactions therein. For example, because the ethylene-methacrylic or ethylene-acrylic acid copolymers are only partially neutralized with the sodium or zinc or lithium ions, then the remainder of the other carboxylic acid groups are free to coordinate with the anatase nano-titanium dioxide.

In one aspect, the cover of the coating free, finished golf ball can also include UV absorbers. Some exemplary UV absorbers can include benzotriazoles, such as TINUVIN® 928 and/or TINUVIN® 571 from BASF Corporation. Other commercially known UV absorbers, such as any BLS® UV absorber from Mayzo, Inc., or UV absorbers from Brenntag North America, Inc., can be used. In one aspect, the UV absorber can include at least one of: hydroxyphenyl benzotriazole; benzophenone; 2-hydroxy-4-n-octoxybenzophenone; 2-(2H-benzotriazol-2-yl)-6-(1-methyl-1-phenyl-ethyl)-4-(1, 1, 3, 3-tetramethylbutyl) phenol; phenol, 2-(2H-benzotriazol-2-yl)-4-methyl-6-dodecyl-; or 2-(4,6-Diphenyl-1,3,5-triazin-2-yl)-5-hexyloxy-phenol. One of ordinary skill in the art would understand that this list of possible compositions is non-exhaustive and other UV absorbers are known to those of ordinary skill in the art. In one aspect, the UV absorbers can be provided in the cover composition at about 0.5%-3.0% w/w. In one aspect, the UV absorbers can be provided in the cover composition at about 0.1%-6.0% w/w. In one aspect, the UV absorbers can be provided in the cover composition at about 1.0%-10.0% w/w. In one aspect, the UV absorbers can be provided in the cover composition at no greater than 5.0% w/w. In one aspect, the UV absorbers can be provided in the cover composition at no greater than 3.0% w/w.

The compositions used to make the layers outside of the core, e.g., the outer cover layer and, when present, the inner cover layer, and/or a single cover layer may contain a variety of fillers and additives to impart specific properties to the golf ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents, fluorescent agents, whitening agents, UV absorbers, light stabilizers, surfactants, processing aids, antioxidants, stabilizers, softening agents, fragrance components, plasti-cizers, impact modifiers, titanium dioxide, clay, mica, talc, glass flakes, milled glass, and mixtures thereof.

Finishing Steps

Golf balls made in accordance with the present disclosure may be subjected to finishing steps such as flash-trimming, surface-treatment, marking, and the like using techniques known in the art. In one embodiment, a white-pigmented cover may be surface-treated using a suitable method such as, for example, corona, plasma, or ultraviolet (UV) light-treatment. The finishing steps do not include any spray, coating, or other steps configured to apply coatings, paint layers, primers, etc. In one example, indicia, such as trade-marks, symbols, logos, letters, and the like may be printed on the cover using pad-printing, ink-jet printing, dye-subli-mation, or other suitable printing methods.

Due to some of the exemplary additives to the cover formulations disclosed herein, challenges may arise if using traditional ink-based printing techniques. Accordingly, any one or more of the following features or steps can be used to add indicia to the coating free, finished golf ball. In one aspect, the indicia is manufactured to be part of the cavity used to mold the golf ball such that after molding, the indicia is molded into the cover and therefore printing is unneces-sary. In one aspect, the cover is clear and the indicia are included on at least one golf ball layer underneath the cover. In one aspect, the cover can be treated with corona or flame treatment prior to applying nitrocellulose, UV ink pad printing, or inkjet printing. One such exemplary corona treatment process is disclosed in U.S. Pat. No. 8,137,212, which is commonly assigned to Acushnet Company and which incorporated in its entirety as if fully set forth herein. In another aspect, the indicia is formed on the cover via hot stamping. In yet another aspect, the indicia can be formed on the cover via etching.

Golf Ball Construction

Golf balls having various constructions may be made in accordance with the present disclosure. For example, golf balls having one-piece, two-piece, three-piece, four-piece, and five or more piece constructions with the term "piece" referring to any core, cover, or intermediate layer of a golf ball construction. Representative illustrations of such golf ball constructions are provided and discussed further below. The term, "layer" as used herein means generally any spherical portion of the golf ball.

In one embodiment, a golf ball of the present disclosure is a one-piece ball where the core and cover form a single integral layer. In another version, shown in FIG. 1A, a golf ball 10 of the present disclosure is a two-piece ball com-prising a single core layer 12 and a single cover layer 14. The single cover layer 14 defines the outermost surface of the golf ball 10, and there are no additional coating or layers applied to the single cover layer 14.

Figure 1B:
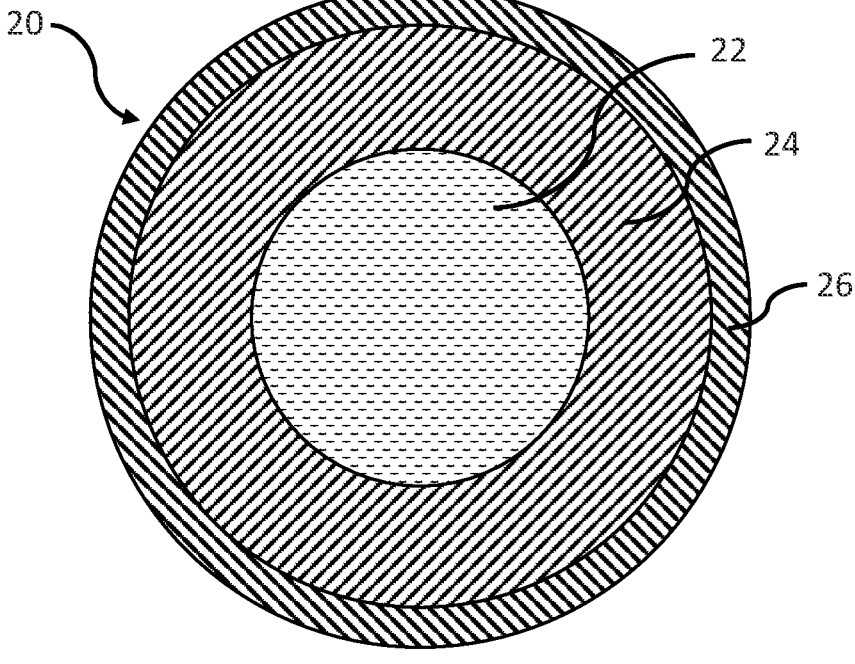
FIG. 1B is a cross-sectional view of a three-piece golf ball in accordance with another example.

As shown in FIG. 1B, in one embodiment, the golf ball 20 comprises a core layer 22, an intermediate layer 24, and a cover layer 26. In FIG. 1B, the intermediate layer 24 can be considered an outer core layer, an inner cover layer, a mantle or casing layer, or any other layer disposed between the core layer 22 and the cover layer 26. The cover layer 26 defines the outermost surface of the golf ball 20, and there are no additional coating or layers applied to the cover layer 26.

Figure 1C:
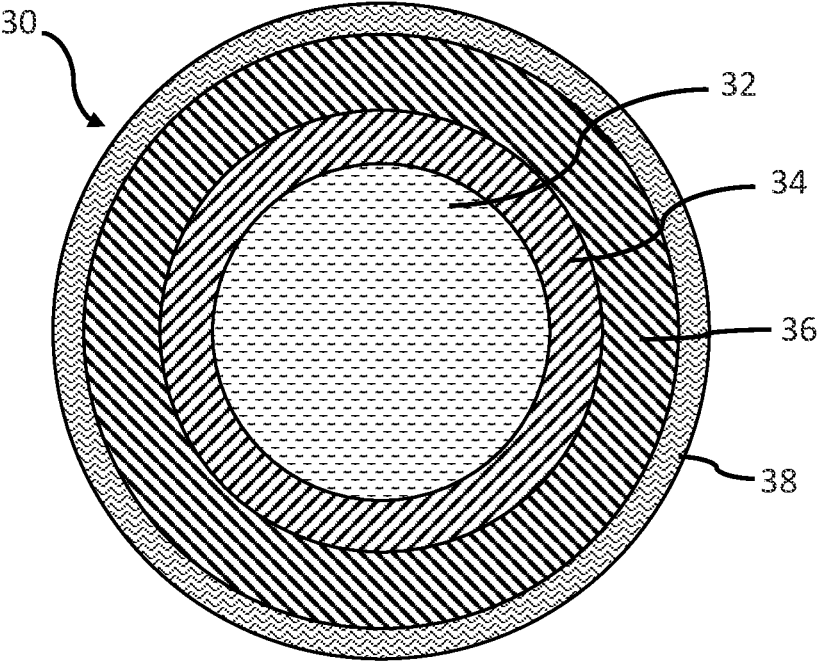
FIG. 1C is a cross-sectional view of a four-piece golf ball in accordance with another example.

Referring to FIG. 1C, in another embodiment, a four-piece golf ball 30 comprises an inner core layer 32, an outer core layer 34, an intermediate layer 36, and an outer cover layer 38. In FIG. 1C, the intermediate layer 36 may be considered a casing or mantle layer, or inner cover layer, or any other layer disposed between the outer core layer 34 and the outer cover layer 38 of the ball 30. The outer cover layer 38 defines the outermost surface of the golf ball 30, and there are no additional coating or layers applied to the outer cover layer 38.

Figure 1D:
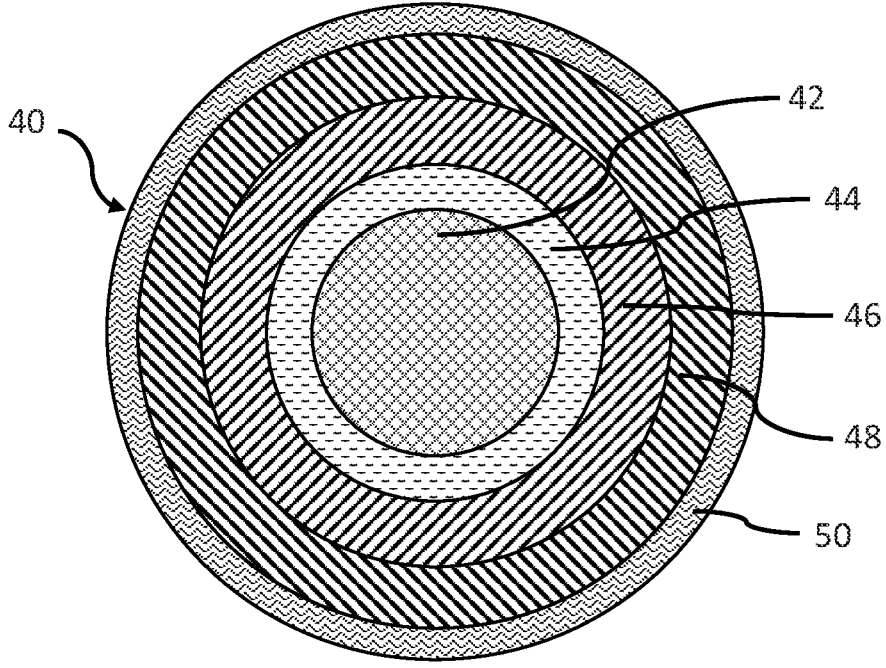
FIG. 1D is a cross-sectional view of a five-piece golf ball in accordance with another example.

Referring to FIG. 1D, in another version, a five-piece golf ball 40 comprises a three-layered core having an inner core layer 42, an intermediate core layer 44, an outer core layer 46, an inner cover layer 48, and an outer cover layer 50. As exemplified herein, a golf ball in accordance with the present disclosure can comprise any combination of any number of core layers, intermediate layers, and cover layers. The outer cover layer 50 defines the outermost surface of the golf ball 40, and there are no additional coating or layers applied to the outer cover layer 50.

The cover of the coating free, finished golf ball disclosed herein includes a plurality of dimples that collectively define a dimple pattern. The dimple pattern and the shapes of the dimples can include known dimple patterns and dimple shapes, such as disclosed in U.S. Pat. No. 8,029,388, which is incorporated by reference in its entirety as if fully set forth herein. One of ordinary skill in the art would understand that the dimple patterns could include, for example tetrahedrons, octahedrons, icosahedrons, and/or dipyramids. In one aspect, the coating free, finished golf ball according to the present disclosure includes a tetrahedral dimple pattern.

Generally, it may be difficult to measure a dimple's diameter due to the indistinct nature of the boundary divid-ing the dimple from the golf ball's undisturbed land surface. The coating free, finished golf ball disclosed herein com-prises a cover that intentionally includes an edge radius to mimic a painted or coated golf ball. One of ordinary skill in the art understands that applying a coating or painting layer to a dimpled golf ball surface inherently produces a distinct, albeit extremely small, rounded corner or radius around otherwise sharp edges of the dimples due to capillary action of the coating or paint material. One of ordinary skill in the art recognizes this rounded corner or radius as an indistinct junction, which is also referred to as the edge radius and is measured by determining the radius of an arc that best fits in the region between the land surface and the dimple sidewall. This geometry can make the measurement of a dimple's diameter difficult or somewhat ambiguous.

Figure 2:
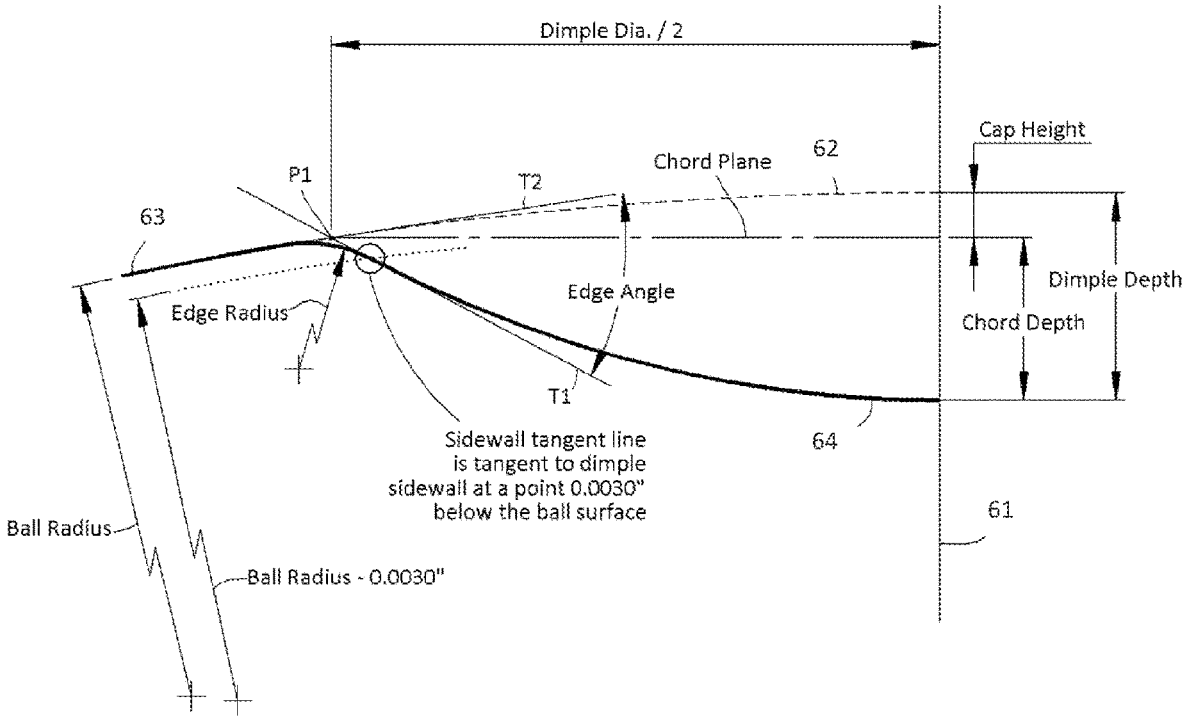
FIG. 2 is a schematic diagram of a portion of a golf ball dimple profile according to one aspect.

FIG. 2 provides an exemplary illustration of a golf ball dimple to further illustrate various characteristics for a golf ball dimple. This illustration is provided, in part, to supply a more detailed context of how the present disclosure modifies the golf ball dimple features to mimic the edge radius found on painted and/or coated golf balls. The dimple diameter can be measured according to the configuration shown in FIG. 2. Referring to FIG. 2, a dimple half-profile 64 is shown which extends from a dimple centerline 61 to a land surface 63 outside of a dimple. A golf ball phantom surface 62 is defined above the dimple as a continuation of the land surface 63. A first tangent line T1 is defined at a point on the dimple sidewall that is spaced 0.003 inches radially inward from the phantom surface 62. The first tangent line T1 intersects the phantom surface 62 at a point P1, which defines a nominal dimple edge position. A second tangent line T2 is defined tangent to the phantom surface 62, at P1. The edge angle is the angle between T1 and T2. The dimple diameter is the distance between P1 and its equivalent point diametrically opposite along the dimple perimeter. Alternatively, the dimple diameter is twice the distance between P1 and the dimple centerline 61, measured in a direction perpendicular to the dimple centerline 61. The dimple depth is the distance measured along a golf ball radius from the phantom surface of the golf ball to the deepest point on the dimple. The chord plane runs through the point P1 and is normal to the dimple centerline 61. The chord depth is the distance from the chord plane to the deepest part of the dimple. The cap height is the distance from the chord plane to the phantom surface 62 along the dimple centerline 61. The dimple volume is the space enclosed between the phantom surface 62 and the dimple surface 64 extended along T1 until it intersects the phantom surface 62.

In view of the foregoing explanation, the dimples of the present coating free, finished golf ball include a manufactured edge radius that is configured to mimic the edge radius of a painted and/or coated golf ball. As used in this context, the term "manufactured edge radius" can refer to an edge radius that is not otherwise formed as a by-product of another process or step, such as applying a coating or painting layer to the dimpled golf ball surface. The manufactured edge radius is an integral and inherent feature of the dimples on the cover, and not a nascent feature brought about via painting, spraying, etc. In one aspect, the edge radius is manufactured on the golf ball cavity and molded into the surface of the golf ball. In another aspect, the golf ball can undergo a surface treatment after molding that rounds the edges of the dimple to create the edge radius. In one aspect, the coating free, finished golf ball does not require any material depositing step (i.e., painting, spraying, dipping, etc.) to form the edge radius.

The average edge radius of all dimples on the coating free, finished golf ball can be between 0.010 inches-0.100 inches, in one example. In another example, the average edge radius of all dimples on the coating free, finished golf ball can be between 0.005 inches-0.200 inches. In another example, the average edge radius of all dimples on the coating free, finished golf ball can be between 0.040 inches-0.080 inches. In another example, the average edge radius of all dimples on the coating free, finished golf ball can be between 0.020 inches-0.060 inches. In another example, the average edge radius of all dimples on the coating free, finished golf ball can be 0.060 inches (+/−0.005 inches). In another example, the average edge radius of all dimples on the coating free, finished golf ball can be 0.040 inches (+/−0.005 inches).

The edge angle of the dimple can preferably be between 11.0-15.0 degrees, or between 12.0-14.0 degrees. In another example, the edge angle of the dimple can be between 10.0 degrees-16.0 degrees. In another example, the edge angle of the dimple can be 13.5 degrees (+/−0.3 degrees). In another example, the edge angle of the dimple can be 11.5 degrees (+/−0.3 degrees). In one example, the edge angle of the dimple can be between 11.0 degrees-14.0 degrees. In another example, the edge angle of the dimple can be between 12.0 degrees-13.0 degrees.

The surface coverage of the dimple pattern can be between 77% and 88%, in one example. In another example, the surface coverage of the dimple pattern can be between 60%-90%. In another example, the surface coverage of the dimple pattern can be between 70%-85%. In another example, the surface coverage of the dimple pattern can be between 80%-85%.

In one example, the total number of dimples can be 300 dimples-400 dimples. In another example, the total number of dimples can be 350 dimples-380 dimples. In another example, the total number of dimples can be 300 dimples-340 dimples. In another example, the total number of dimples can be 370 dimples-390 dimples. One of ordinary skill in the art would understand that less than 300 dimples can be provided, or more than 400 dimples can be provided.

The dimple pattern of the coating free, finished golf ball can include various sized dimples. In one example, the dimple pattern includes dimples having five different dimple diameters. In one example, the dimple pattern includes dimples having two, three or four different dimple diameters. In another example, the dimple pattern includes dimples having eight different dimple diameters. In one example, the dimple pattern includes dimples having more than eight different dimple diameters. In other examples, the dimple pattern can include dimples all having either identical dimple diameters or having any number of different dimple diameters.

Golf Ball Properties

Hardness

The hardness of the geometric center of the core may be obtained according to the following: the core is first gently pressed into a hemispherical holder having an internal diameter approximately slightly smaller than the diameter of the core, such that the core is held in place in the hemispherical portion of the holder while concurrently leaving the geometric central plane of the center exposed. The core is secured in the holder by friction, such that it will not move during the cutting and grinding steps, but the friction is not so excessive that distortion of the natural shape of the core would result. The core is secured such that the parting line of the center is roughly parallel to the top of the holder. The diameter of the center is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the geometric center of the core is confirmed with a center square and carefully marked, and the hardness is measured at the center mark according to ASTM D-2240.

Additional hardness measurements at any distance from the geometric center of the core can then be made by drawing a line radially outward from the geometric center mark and measuring the hardness at any given distance along the line, typically in 2 mm increments from the center of the core. The hardness at a particular distance from the geometric center should be measured along at least two, preferably four, radial arms located 1800 apart, or 900 apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of the core (or any golf ball layer) is measured on the actual outer surface of the layer and is obtained from the average of a number of measurements taken from opposing hemispheres, taking care to avoid making measurements on the parting line of the core or on surface defects, such as holes or protrusions and preferably making the measurements prior to surrounding the layer of interest with an additional layer. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240. It is worthwhile to note that, once an additional layer surrounds a layer of interest, the hardness of the layer of interest can be difficult to determine. Therefore, for purposes of the present disclosure, when the hardness of a layer is needed after the inner layer has been surrounded with another layer, the test procedure for measuring a point located 1 mm from an interface is used.

It should also be noted that there is a fundamental difference between "material hardness" and "hardness as measured directly on a golf ball" (or, as used herein, "surface hardness"). For purposes of the present disclosure, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of layers, and the like); ball (or ball sub-assembly) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

A golf ball core made from the rubber formulation of the present disclosure may have a hardness at the geometric center of the core, referred to herein as HC, that ranges from about 40 to about 90 Shore C. In one embodiment, the core has a hardness at its geometric center of about 45 to about 65 Shore C or about 48 to about 58 Shore C or about 49 to about 52 Shore C. In another embodiment, the core has a hardness at its geometric center of about 55 to about 75 Shore C or about 60 to about 66 Shore C or about 68 to about 74 Shore C. In yet another embodiment, the core has a hardness at its geometric center of about 65 to about 85 Shore C or about 66 to about 74 Shore C or about 77 to about 84 Shore C.

The hardness at the surface of the core, referred to herein as HS, may range from about 60 to about 95 Shore C. In one embodiment, the hardness at the surface of the core is about 70 to about 95 Shore C or about 72 to about 82 Shore C or about 85 to about 95 Shore C or about 87 to about 93 Shore C. In another embodiment, the hardness at the surface of the core is about 65 to about 95 Shore C or about 73 to about 93 Shore C or about 74 to about 84 Shore C. In yet another embodiment, the hardness at the surface of the core is about 72 to about 95 Shore C or about 77 to about 85 Shore C or about 88 to about 94 Shore C.

The direction of the hardness gradient is defined by the difference in hardness measurements taken at the geometric center and outer surfaces of the core. The geometric center hardness is readily determined according to the test procedures provided above. For example, the hardness of the outer surface of the core is also readily determined according to the procedures given herein for measuring the outer surface hardness of a golf ball layer, if the measurement is made prior to surrounding the core with additional layers.

While the hardness gradient across the core will vary based on several factors including, but not limited to, the dimensions and formulations of the components, the core of the present disclosure has a "positive" hardness gradient (that is, the geometric center is softer than the outer surface of the core). More particularly, the term, "positive hardness gradient" as used herein means a hardness gradient of positive about 2 Shore C or greater, about 4 Shore C or greater, about 6 Shore C or greater, about 8 Shore C or greater, or about 10 Shore C or greater. In general, the hardness gradient may be determined by subtracting the hardness value of one component being measured (for example, the geometric center of the core, HC) from the hardness value of another component being measured (for example, the outer surface of the core, HS).

The core of the present disclosure has a positive hardness gradient. In one embodiment, the core has a positive hardness gradient from the geometric center to the surface of the core of about 2 Shore C to 42 Shore C. In this aspect, the positive hardness gradient of the core is about 5 Shore C to about 40 Shore C. The rubber formulation of the core may be tailored to produce a desired hardness gradient in the core. In some embodiments, the positive hardness gradient of the core is about 30 to about 42 Shore C or about 34 Shore C to 41 Shore C or about 37 Shore C to about 40 Shore C. In other embodiments, the positive hardness gradient of the core is about 3 Shore C to about 25 Shore C or about 10 Shore C to about 23 Shore C, or about 11 Shore C to about 17 Shore C. In further embodiments, the positive hardness gradient of the core may be about 2 Shore C to about 40 Shore C or about 7 Shore C to about 12 Shore C or about 8 Shore C to 11 Shore C.

The hardness of the core may not increase linearly from the center of the core to the outer surface of the core. For example, one or more regions within the core may have a "zero" hardness gradient, i.e., the hardness values across the region are substantially the same. The term, "zero hardness gradient" as used herein means a hardness gradient of –2 Shore C to 2 Shore C, preferably between about –1 Shore C and about 1 Shore C and may have a value of zero. In some embodiments, one or more regions of the core may also have a "negative" hardness gradient, i.e., the hardness values across the region may decrease from the inner edge of the region to the outer edge of the region.

For example, the core, or a layer of the core if the core has multiple layers, may be characterized by three regions: an inner region, an intermediate region, and an outer region. Each of the inner region, intermediate region, and outer region may have its own hardness gradient. For a single-layer core, the inner region is the region of the core surrounding the center of the core and is characterized by positive hardness gradient of about 2 Shore C to about 25 Shore C. In some embodiments, the positive hardness gradient of the inner region of the core is about 6 Shore C to about 25 Shore C or about 16 Shore C to about 23 Shore C. In other embodiments, the positive hardness gradient of the inner region of the core is about 1 Shore C to about 13 Shore C or about 6 Shore C to about 11 Shore C. In further embodiments, the positive hardness gradient of the inner region of the core is about 5 Shore C to about 9 Shore C or about 6 Shore C to about 8 Shore C.

The outer region of the core is the region of the core adjacent the surface of the core and may be characterized by a zero or positive hardness gradient from about –2 Shore C to about 28 Shore C. In some embodiments, the outer region may have a positive hardness gradient from 2 Shore C to about 27 Shore C or about 16 Shore C to about 27 Shore C or about 17 Shore C to about 22 Shore C. In other embodiments, the outer region may have a zero or positive hardness gradient from –2 Shore C to about 16 Shore C or about 2 Shore C to about 6 Shore C or about 10 Shore C to about 15 Shore C. In further embodiments, the outer region may have a zero or positive hardness gradient from –2 Shore C to about 14 Shore C or about 1 Shore C to about 8 Shore C or about 2 Shore C to about 6 Shore C.

The intermediate region of the core is the region of the core between the inner region and the outer region and may be characterized by a negative, zero, or positive hardness gradient from about –10 to 8 Shore C. In some embodiments, the intermediate region may have a negative, zero, or positive hardness gradient from –7 to about 6 Shore C or about –6 to about 1 Shore C. In other embodiments, the intermediate region may have a positive hardness gradient from –7 to about 4 Shore C or about –2 to about 4 Shore C. In further embodiments, the intermediate region may have a negative or zero hardness gradient from –10 to about 0 Shore C or about –4 Shore C to about 0 Shore C.

In some embodiments, a point or plurality of points measured along a "positive" gradient may be above or below a line fit through the gradient and its outermost and innermost hardness values. In an alternative embodiment, the hardest point along a particular steep "positive" gradient may be higher than the value at the innermost portion of the center (the geometric center) or outer surface of the core—as long as the outermost point (i.e., the outer surface of the core) is greater than the innermost point (i.e., the geometric center of the core), such that the "positive" gradients remain intact.

Compression

Several different methods can be used to measure compression, including Atti compression, Riehle compression, load/deflection measurements at a variety of fixed loads and offsets, and effective modulus (see, e.g., Compression by Any Other Name, Science and Golf IV, Proceedings of the World Scientific Congress of Golf (Eric Thain ed., Routledge, 2002) (J. Dalton)). For purposes of the present disclosure, compression values are provided as measured by the Dynamic Compression Machine ("DCM") as well as the Soft Center Deflection Index ("SCDI"). The DCM applies a load to a ball component or a ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test.

The SCDI is a slight variation of the DCM set up that allows determination of the pounds required to deflect a component or ball 10 percent of its diameter. With the SCDI, the goal is to obtain the pounds of force required to deflect a component or ball a certain number of inches. That amount of deflection is 10 percent of the component or ball diameter. The DCM is triggered, the cylinder deflects the component or ball by 10 percent of its diameter, and the DCM reports back the pounds of force required (as measured from the attached load cell) to deflect the component or ball by that amount. The SCDI value obtained is a single number in units of pounds.

The compression of a core made from the rubber formulation of the present disclosure may range from about 20 to about 120 DCM or more preferably about 50 to about 120 DCM. For example, the core compression may be about 50 to about 85 DCM or about 60 to 80 DCM or about 65 to about 75 DCM. In another example, the core compression may range from about 50 to about 100 DCM or about 55 to about 65 DCM or about 80 to 100 DCM. In another example, the core compression may range from about 55 to about 60 DCM. In yet another example, the core compression is about 60 to about 120 DCM or about 110 to about 120 DCM or about 60 to about 80 DCM or about 71 to about 79 DCM. In some embodiments, it may be desirable for a core comprising the rubber formulation of the present disclosure to have a compression from about 68 to about 75 DCM or from about 70 to about 74 DCM regardless of the hardening agent used.

Diameter

The diameter of the core may vary. In some embodiments, the core diameter may range from about 1.50 inches to about 1.58 inches. In some embodiments, the core diameter may range from about 1.58 inches to about 1.62 inches. In some embodiments, the core may have a diameter of 1.53 inches to 1.56 inches. In embodiments where the core comprises two or more layers, the diameter of the inner layer of the core may range from about 1.0 inches to about 1.4 inches or from about 1.0 inches to about 1.2 inches. In one configuration, the core can have a diameter of 1.600 inches (+/–

0.002 inches). In one configuration, the core can have a diameter of 1.550 inches (+/−0.002 inches). In one configuration, a casing layer is provided that has a diameter of 1.630 inches (+/−0.002 inches).

Coefficient of Restitution

The golf ball cores of the present disclosure can be tailored to have a desired or targeted coefficient of restitution (CoR) value. In one example, it may be desirable to have a golf ball core with a relatively high CoR value. In one example, the CoR of the golf ball cores formed according to the present disclosure at 125 ft/s is about 0.740 or greater. In another example, the CoR of the golf ball core according to the present disclosure at 125 ft/s is about 0.860 or greater. One of ordinary skill in the art would understand based on the present disclosure that these CoR values can vary.

Various exemplary configurations for an unpainted finished golf ball are described herein. Each of the exemplary configurations lack any paint, primer, topcoat, and/or coating. The exemplary configurations include features, such as additives to the cover material composition, dimple profile modifications, and/or indicia printing techniques, to address deficiencies that can otherwise arise when producing a coating free, finished golf ball.

In one example, a coating free, finished golf ball is disclosed herein that has a two-piece construction, i.e., a core and a cover. In another example, a coating free, finished golf ball is disclosed herein that has a three-piece construction, i.e., a core, a casing, and a cover. In another example, a coating free, finished golf ball is disclosed herein that has a four-piece construction, i.e., a dual layer core, a casing, and a cover. In another example, a coating free, finished golf ball is disclosed herein that has a five-piece construction, i.e., a dual layer core, a dual layer casing, and a cover.

The cover can be formed from a base composition comprised primarily of ionomer. For example, the ionomer can be formed from a medium acid ionomer, such as Surlyn® 7940, Surlyn® 8940, Surlyn® 8945, or Surlyn® 9945. In other examples, high acid ionomers, such as Surlyn® 8150, Surlyn® 9120, or Surlyn® 9150, can be used. In another example, any mixture or blend of two ionomers, such as both high and medium acid ionomers, can be used. The term ionomer is used herein with respect to certain base cover layer compositions, but can refer to any single ionomer or blend of ionomers.

The base cover layer composition can further include a silicone-based or siloxane-based cleaning additive, such as BYK®-SILCLEAN 3700, to form an initial cover layer material composition. In one aspect, the silicone-based or siloxane-based cleaning additive can be mixed with the base composition of the ionomer such that the silicone-based or siloxane-based cleaning additive comprises 1%-20% of the initial cover layer material composition. In another aspect, the silicone-based or siloxane-based cleaning additive can be mixed with the base composition of the ionomer such that the silicone-based or siloxane-based cleaning additive comprises 1%-10% of the initial cover layer material composition. In another aspect, the silicone-based or siloxane-based cleaning additive can be mixed with the base composition of the ionomer such that the silicone-based or siloxane-based cleaning additive comprises 3%-10% of the initial cover layer material composition. In another aspect, the silicone-based or siloxane-based cleaning additive can be mixed with the base composition of the ionomer such that the silicone-based or siloxane-based cleaning additive comprises 3%-6% of the initial cover layer material composition. In another aspect, the silicone-based or siloxane-based cleaning additive can be mixed with the base composition of the ionomer such that the silicone-based or siloxane-based cleaning additive comprises less than 15% of the initial cover layer material composition. In another aspect, the silicone-based or siloxane-based cleaning additive can be mixed with the base composition of the ionomer such that the silicone-based or siloxane-based cleaning additive comprises at least 3% of the initial cover layer material composition.

The initial cover layer material composition (i.e., ionomer and silicone-based or siloxane-based cleaning additive mixture) can further be combined with a secondary medium acid ionomer, such as Surlyn® 7940, Surlyn® 8940, Surlyn® 8945, or Surlyn® 9945.

The initial cover layer material composition (i.e., ionomer and silicone-based or siloxane-based cleaning additive mixture) can further be combined with a maleic anhydride-grafted non-ionomeric polymer. In one example, the maleic anhydride-grafted non-ionomeric polymer can be Fusabond® N525.

The initial cover layer material composition can further be combined with another copolymer of ethylene and methacrylic acid, such as Nucrel® 960.

The combined or final cover layer material composition can include Surlyn® 7940, Surlyn® 8945, BYK®-SILCLEAN 3700, Fusabond® N525, and Nucrel® 960. In one aspect, the combined or final cover layer material composition can include: (i) 50%-70% of a mixture of Surlyn® 7940 and BYK®-SILCLEAN 3700; (ii) 10%-30% Surlyn® 8945; (iii) 10%-30% of Fusabond® N525; and/or (iv) 1%-10% of Nucrel® 960.

In one aspect, the combined or final cover layer material composition can include:

(i) 70% of a mixture of Surlyn® 7940 and BYK®-SILCLEAN 3700; (ii) 20% Surlyn® 8945; (iii) 5% of Fusabond® N525; and (iv) 5% of Nucrel® 960; or (i) 65% of a mixture of Surlyn® 7940 and BYK®-SILCLEAN 3700; (ii) 15% Surlyn® 8945; (iii) 10% of Fusabond® N525; and (iv) 10% of Nucrel® 960; or (i) 60% of a mixture of Surlyn® 7940 and BYK®-SILCLEAN 3700; (ii) 15% Surlyn® 8945; (iii) 20% of Fusabond® N525; and (iv) 5% of Nucrel® 960; or (i) 55% of a mixture of Surlyn® 7940 and BYK®-SILCLEAN 3700; (ii) 25% Surlyn® 8945; (iii) 10% of Fusabond® N525; and (iv) 10% of Nucrel® 960; or (i) 75% of a mixture of Surlyn® 7940 and BYK®-SILCLEAN 3700; (ii) 5% Surlyn® 8945; (iii) 10% of Fusabond® N525; and (iv) 10% of Nucrel® 960; or (i) 70% of a mixture of Surlyn® 7940 and BYK®-SILCLEAN 3700; (ii) 15% Surlyn® 8945; (iii) 10% of Fusabond® N525; and (iv) 5% of Nucrel® 960.

In one aspect, the cover layer can be formed from a base material including polyurethane, polyurea, or a hybrid of polyurethane-polyurea. The base polyurethane, polyurea, or hybrid of polyurethane-polyurea can be mixed with a curing agent and a silicone-based or siloxane-based cleaning additive. In one aspect, the present composition can include a polyurethane, polyurea, or polyurethane-urea hybrid prepolymer that is reacted with a curative mixture, which can include a curing agent and/or chain extender. In one example, the silicone-based or siloxane-based cleaning additive can be mixed with the curative mixture such that the final cured polymer comprises 1%-15% of the silicone-based or siloxane-based cleaning additive. In one example, the silicone-based or siloxane-based cleaning additive can be mixed with the curative mixture such that the final cured polymer comprises no more than 10% of the silicone-based or siloxane-based cleaning additive. In one example, the silicone-based or siloxane-based cleaning additive can be mixed with a curative mixture such that the final cured polymer comprises at least 3% of the silicone-based or siloxane-based cleaning additive. In one example, the silicone-based or siloxane-based cleaning additive can be mixed with a curative mixture such that the final cured polymer comprises 3%-6% of the silicone-based or siloxane-based cleaning additive. In one example, the curing agent and silicone-based or siloxane-based cleaning additive mixture can be reacted at 3%-6% and mixed prior to blending or mixing with the base material.

In one example, the curing agent can be an aromatic diamine-based curing agent.

The curing agent can include polyamine curatives such as 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline; m-phenylenediamine; 4,4'-methylene-bis-(2-chloroaniline); 4,4'-methylene-bis-(2,6-diethylaniline); 4,4'-methylene-bis-(2,3-dichloroaniline); 4,4'-diamino-3,3'-diethyl-5,5'-dimethyl diphenylmethane; 2,2', 3,3'-tetrachloro diamino diphenylmethane; trimethylene glycol di-p-aminobenzoate; and mixtures thereof. Exemplary curing agents can include ETHACURE® 100 or ETHACURE® 300 (both commercially available from Albermarle Corporation of Baton Rouge, LA), or similar products.

In one embodiment, the polyurethane mixture can have a wt. % NCO content in the range of 4-20. In other embodiments, the wt. % NCO content is in the range of 4-7.0. In other embodiments, the wt. % NCO content is in the range of 5.0-6.0. In other embodiments, the wt. % NCO content is 5.6 (+/−0.1).

The polyurethane, curing additive, and cleaning additive can be further mixed or combined with UV absorbers. The UV absorbers can include benzotriazoles, such as TINUVIN® 928 or TINUVIN® 571 from BASF Corporation. Other commercially known UV absorbers, such as any BLS® UV absorber from Mayzo, Inc., or UV absorbers from Brenntag North America, Inc., can be used. In one aspect, the UV absorbers can be provided or mixed in the cover composition at 0.5%-3.0% w/w.

In one example, a coating free, finished two-piece golf ball is provided that includes a core and a cover defining an outermost surface of the coating free, finished golf ball. The two-piece golf ball does not include any coatings, and does not include any additional layers besides the cover. The cover can be an ionomer-based cover. The cover can be formed from a composition comprising ionomer and at least one of: (i) a silicone-based cleaning additive or a siloxane-based cleaning additive; (ii) a gloss-enhancing additive; (iii) a polydimethylsiloxane based soft segment; or (iv) an anatase nano-titanium dioxide (TiO2). In some examples, a combination of any one of these additives can be used with the ionomer base material. In one aspect, the coating free, finished two-piece golf ball consists essentially of the core and the cover. In one aspect, the coating free, finished two-piece golf ball consists exactly of the core and the cover.

The composition of the cover can further comprise an ultraviolet absorbing additive. The ultraviolet absorbing additive can be benzotriazole-based.

Markings, such as logos, player numbers, and other annotations can be provided on the coating free, finished golf ball. These markings can be provided through means other than traditional ink printing processes. For example, the marking can be integrally molded into the cover. The marking can be disposed on a layer of the golf ball positioned radially inward from the cover, and the cover can be transparent. For example, the marking can be formed on an outer surface of the core. The marking can be printed on the cover after the cover receives a pretreatment, such as corona or flame treatment. The marking can be formed on the cover via at least one of: hot stamping, UV pad printing, or nitrocellulose ink pad printing. In one specific example, the marking is formed via hot stamping.

The cover can have a dimple pattern comprising a plurality of dimples, and an average edge radius among all of the plurality of dimples can be 0.010 inches-0.100 inches. The average edge radius among all of the plurality of dimples can be 0.050 inches-0.070 inches. The cover can have a dimple pattern comprising a plurality of dimples each having an edge angle of 10.0 degrees-15.0 degrees. In one example, the edge angle can be 13.0 degrees-14.0 degrees. In another example, the edge angle can be 11.0 degrees-14.0 degrees. In another example, the edge angle can be 12.0 degrees-13.0 degrees.

The core can have a diameter of 1.55 inches-1.65 inches, in one embodiment. The diameter of the core can be 1.600 inches (+/−0.020 inches). In one example, the core can have a compression of 55 DCM-60 DCM. In one example, the core can have a compression of 58 DCM.

In another example, a coating free, finished golf ball is provided that consists essentially of a core and a cover defining an outermost surface of the coating free, finished golf ball. The cover defines an outermost and exposed surface of the finished golf ball, and the finished golf ball does not include any coatings. The cover can be formed from a composition comprising ionomer and a silicone-based cleaning additive or a siloxane-based cleaning additive. The cover has a dimple pattern comprising a plurality of dimples, and an average edge radius among all of the plurality of dimples is 0.055 inches-0.065 inches. The cover includes at least one marking integrally molded thereon.

In another embodiment, a method of forming a coating free, finished golf ball is disclosed herein. The method can comprise providing a golf ball sub-assembly comprising a core and a casing; forming a cover around an outermost surface of the golf ball sub-assembly, the cover being formed from a composition comprising ionomer and at least one of a silicone-based cleaning additive or a siloxane-based cleaning additive; and forming at least one marking directly on the cover via integrally molding the at least one marking into the cover. The golf ball is thereby formed without any printing, spraying, or coating steps.

The method can alternatively include forming the marking via providing a clear cover and forming the marking on the outer surface of the core; and/or treating the cover surface with corona or flame pretreatment and applying a nitrocellulose, or UV ink via pad printing, or ink jet printing; and/or hot stamping.

The method can alternatively include forming the cover from a composition comprising ionomer and a gloss-enhancing additive; and/or a polydimethylsiloxane based soft segment; and/or an anatase nano-titanium dioxide.

The method of forming the coating free, finished golf ball does not include any coating applicating steps, such as paints, primers, topcoats, etc. Instead, the method of forming the coating free, finished golf ball is a coating-less method for forming a golf ball that is ready for retail and ordinary play. After the method steps recited herein, the coating free, finished golf ball is ready to be packaged and sold at retail without any additional or intermediary steps for applying painting, coating, primer, topcoats, etc. There are no spraying steps associated with formation of the method disclosed herein.

Another coating free, finished golf ball is also disclosed herein that includes a core and a cover defining an outermost surface of the coating free, finished golf ball. The cover can be formed from a composition comprising polyurethane, polyurea, or hybrid of polyurethane-polyurea and at least one of: (i) a silicone-based cleaning additive or a siloxane-based cleaning additive; (ii) a gloss-enhancing additive; (iii) a polydimethylsiloxane based soft segment; or (iv) an anatase nano-titanium dioxide (TiO2). In one example, the coating free, finished golf ball can consist of the core and a cover, with a casing disposed between the core and the cover. The casing can be formed from ionomer in one example. The coating free, finished golf ball does not include any further layers or components besides the core, casing, and the cover. The coating free, finished golf ball does not include any paint or coating layers. The coating free, finished golf ball can consist essentially of the core, casing, and cover, in one example. The coating free, finished golf ball can consist exactly of the core, casing, and cover.

The composition of the cover can further comprise an ultraviolet absorbing additive. The ultraviolet absorbing additive can be benzotriazole-based.

A marking can be integrally molded into the cover. In another example, the marking can be disposed on a layer of the golf ball positioned radially inward from the cover, and the cover can be transparent. A pretreatment can be applied to the cover in another example. The marking can be applied to the cover via at least one of: hot stamping, UV pad printing, or nitrocellulose ink pad printing. In one specific example, the marking is formed via hot stamping.

The cover can have a dimple pattern comprising a plurality of dimples, and an average edge radius among all of the plurality of dimples is 0.010 inches-0.100 inches. The cover can have a dimple pattern comprising a plurality of dimples each having an edge angle of 10.0 degrees-15.0 degrees. The edge angle can be 11.0 degrees-12.0 degrees. In another example, the edge angle of the dimple can be 11.5 degrees (+/−0.3 degrees). The core can have a diameter of 1.50 inches-1.60 inches, and more preferably can have a diameter of 1.550 inches (+/−0.002 inches).

In another aspect, a golf ball is provided that consists essentially of a core, a casing surrounding the core, and a cover defining an outermost surface of the coating free, finished golf ball. The cover is formed from a composition comprising polyurethane, polyurea, or hybrid of polyurethane-polyurea, a silicone-based cleaning additive or a siloxane-based cleaning additive, and an ultraviolet absorbing additive. The cover has a dimple pattern comprising a plurality of dimples, and an average edge radius among all of the plurality of dimples is 0.030 inches-0.050 inches. The cover includes at least one marking formed via at least one of: hot stamping, UV pad printing, or nitrocellulose ink pad printing. The cover has a dimple pattern comprising a plurality of dimples each having an edge angle of 11.0 degrees-12.0 degrees. The casing can be formed from ionomer.

A method of forming a coating free, finished golf ball is also disclosed herein. The method comprises providing a golf ball sub-assembly comprising a core and a casing; forming a cover around an outermost surface of the golf ball sub-assembly, the cover being formed from a composition comprising polyurethane, polyurea, or hybrid of polyurethane-polyurea and at least one of a silicone-based cleaning additive or a siloxane-based cleaning additive; and forming at least one marking directly on the cover via at least one of: hot stamping, UV pad printing, or nitrocellulose ink pad printing. The method lacks any painting or coating steps and instead a fully finished, coating free golf ball is provided without any coating, painting, etc. In one aspect, there are no spraying steps included in this method, and the method explicitly and intentionally does not include any spraying steps at any stage during the formation of the golf ball. The method can further conclude with packaging the coating free, finished golf ball for retail.

The method can further comprise forming the cover with a dimple pattern comprising a plurality of dimples, and an average edge radius among all of the plurality of dimples is 0.030 inches-0.050 inches. The method can further comprise forming the cover to have a dimple pattern comprising a plurality of dimples each having an edge angle of 11.0 degrees-12.0 degrees. In another example, the edge angle of the dimple can be 11.5 degrees (+/−0.3 degrees).

The method can further comprise forming the cover from a composition also including an ultraviolet absorbing additive.

Figure 3:
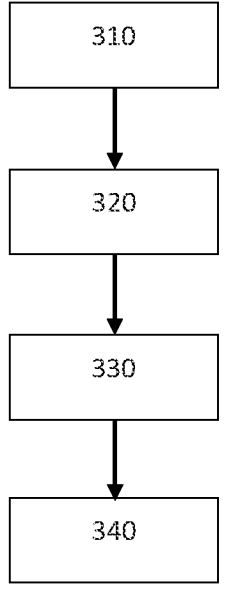
FIG. 3 is a flow diagram illustrating steps according to one method of the present disclosure.

Referring to FIG. 3, one specific method of method of forming a coating free, finished golf ball with an ionomer cover is illustrated. The method includes providing a golf ball sub-assembly comprising a core (step 310). Next, the method includes step 320 which includes forming the cover from a composition including ionomer and at least one cleaning additive, such as a silicone-based cleaning additive or a siloxane-based cleaning additive. Step 330 includes disposing the cover around an outermost surface of the golf ball sub-assembly. Step 340 includes forming at least one marking directly on the cover via integrally molding the at least one marking into the cover. The method of FIG. 3 specifically lacks any painting or coating formation steps, such that the ionomer cover is unvarnished.

Figure 4:
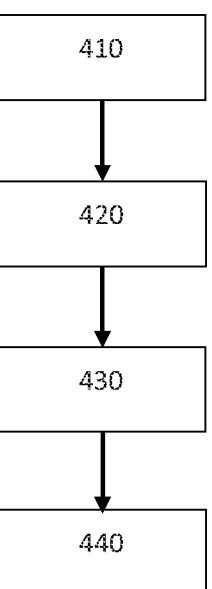
FIG. 4 is a flow diagram illustrating steps according to another method of the present disclosure.

Referring to FIG. 4, another specific method of forming a coating free, finished golf ball with a polyurethane, polyurea, or hybrid of polyurethane-polyurea cover is illustrated. Step 410 includes providing a golf ball sub-assembly comprising a core and a casing. Step 420 includes forming a cover composition from polyurethane, polyurea, or hybrid of polyurethane-polyurea and at least one of a silicone-based cleaning additive or a siloxane-based cleaning additive. Step 430 includes disposing the cover, which includes polyurethane, polyurea, or hybrid of polyurethane-polyurea and a cleaning additive, around an outermost surface of the golf ball sub-assembly. Step 440 then includes forming at least one marking directly on the cover via at least one of: hot stamping, UV pad printing, or nitrocellulose ink pad printing. The method of FIG. 4 specifically lacks any painting or coating formation steps, such that the cover is unvarnished.

As described throughout the present disclosure, a golf ball is disclosed that is both fully finished (i.e., suitable for retail and ordinary play), and lacks any coating or painting. In some examples, the golf ball is formed from exactly two components: a cover and a core. In some examples, the golf ball is formed from exactly three components: a cover, a casing, and a core. Regardless of the specific configuration the outermost component solely consists of the cover and not a painting layer, coating layer, or other component.

In some instances, a printed marking can be present on the cover but one of ordinary skill in the art understands that the marking does not cover, coat, or otherwise define the outermost layer of the golf ball.

The golf ball can be formed without requiring spraying, coating, or other application techniques typically associated with providing surface treatments or paints to an unfinished golf ball. By avoiding these steps, the present disclosure provides a finished golf ball that provides more consistent aerodynamics.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure.

The compositions of all commercially available products disclosed herein are incorporated by reference in their entirety as if fully set forth herein. Additionally, any chemically equivalent compositions or compounds of the commercially available products disclosed herein can be used.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety.

What is claimed is:

1. A coating free, finished golf ball comprising:
a core; and
a cover defining an outermost surface of the coating free, finished golf ball, such that the cover is bare, the cover being formed from a composition comprising polyurethane, polyurea, or hybrid of polyurethane-polyurea, and at least one of:
(i) a silicone-based cleaning additive or a siloxane-based cleaning additive; or
(ii) a polydimethylsiloxane based soft segment.

2. The coating free, finished golf ball according to claim 1, wherein the composition of the cover further comprises an ultraviolet absorbing additive.

3. The coating free, finished golf ball according to claim 2, wherein the ultraviolet absorbing additive is benzotriazole-based.

4. The coating free, finished golf ball according to claim 1, further comprising at least one marking on the cover.

5. The coating free, finished golf ball according to claim 4, wherein the at least one marking is formed via hot stamping.

6. The coating free, finished golf ball according to claim 4, wherein the at least one marking is configured to be printed on the cover after the cover receives a pretreatment.

7. The coating free, finished golf ball according to claim 4, wherein the at least one marking is formed on the cover via at least one of: integral molding with the cover, UV pad printing, or nitrocellulose ink pad printing.

8. The coating free, finished golf ball according to claim 1, wherein at least one marking is disposed on a layer of the golf ball positioned radially inward from the cover, and the cover is transparent.

9. The coating free, finished golf ball according to claim 1, wherein the cover has a dimple pattern comprising a plurality of dimples, and an average edge radius among all of the plurality of dimples is 0.010 inches-0.100 inches.

10. The coating free, finished golf ball according to claim 9, wherein the average edge radius among all of the plurality of dimples is 0.030 inches-0.050 inches.

11. The coating free, finished golf ball according to claim 1, wherein the cover has a dimple pattern comprising a plurality of dimples each having an edge angle of 10.0 degrees-15.0 degrees.

12. The coating free, finished golf ball according to claim 11, wherein the edge angle is 11.0 degrees-12.0 degrees.

13. The coating free, finished golf ball according to claim 1, further comprising an ionomer casing between the core and the cover.

14. A coating free, finished golf ball consisting essentially of:
a core;
a casing surrounding the core; and
a cover defining an outermost surface of the coating free, finished golf ball, such that the cover is bare, the cover being formed from a composition comprising:
polyurethane, polyurea, or hybrid of polyurethane-polyurea,
a silicone-based cleaning additive or a siloxane-based cleaning additive, and
an ultraviolet absorbing additive;
wherein the cover has a dimple pattern comprising a plurality of dimples, and an average edge radius among all of the plurality of dimples is 0.030 inches-0.050 inches, and
the cover includes at least one marking formed via at least one of: integral molding with the cover, hot stamping, UV pad printing, or nitrocellulose ink pad printing.

15. The coating free, finished golf ball according to claim 14, wherein the cover has a dimple pattern comprising a plurality of dimples each having an edge angle of 11.0 degrees-12.0 degrees.

16. The coating free, finished golf ball according to claim 14, wherein the casing is formed from ionomer.

17. A method of forming a coating free, golf ball, the method comprising:
providing a golf ball sub-assembly comprising a core and a casing;
forming a cover around an outermost surface of the golf ball sub-assembly, the cover being formed from a composition comprising polyurethane, polyurea, or hybrid of polyurethane-polyurea, and at least one of a silicone-based cleaning additive or a siloxane-based cleaning additive; and
forming at least one marking directly on the cover via hot stamping, UV pad printing, or nitrocellulose ink pad printing.

18. The method according to claim 17, wherein the cover has a dimple pattern comprising a plurality of dimples, and an average edge radius among all of the plurality of dimples is 0.030 inches-0.050 inches.

19. The method according to claim 17, wherein the cover has a dimple pattern comprising a plurality of dimples each having an edge angle of 11.0 degrees-12.0 degrees.

20. The method according to claim 17, wherein the cover is further comprised of an ultraviolet absorbing additive.

21. The coating free, finished golf ball according to claim 1, wherein the composition of the cover is comprised of polyurethane, polyurea, or hybrid of polyurethane-polyurea and the silicone-based cleaning additive or the siloxane-based cleaning additive.

22. The coating free, finished golf ball according to claim 1, wherein the composition of the cover is comprised of polyurethane, polyurea, or hybrid of polyurethane-polyurea and the polydimethylsiloxane based soft segment.

* * * * *